(12) United States Patent
Dolphin et al.

(10) Patent No.: US 8,555,872 B2
(45) Date of Patent: Oct. 15, 2013

(54) SOLAR HEATER

(76) Inventors: John Allan Dolphin, Edina, MN (US);
Allan Gary Finney, Regina (CA)

( * ) Notice: Subject to any disclaimer, the term of this patent is extended or adjusted under 35 U.S.C. 154(b) by 235 days.

(21) Appl. No.: 13/040,908

(22) Filed: Mar. 4, 2011

(65) Prior Publication Data

US 2012/0222670 A1    Sep. 6, 2012

(51) Int. Cl.
*F24J 2/46*           (2006.01)
(52) U.S. Cl.
USPC ........... 126/704; 126/705; 126/706; 126/707; 126/709; 126/710; 126/711; 126/648; 126/650
(58) Field of Classification Search
USPC ......... 126/704, 705, 706, 707, 709, 710, 711, 126/713, 617, 634, 648, 650; 136/206; 29/890.033
See application file for complete search history.

(56) References Cited

U.S. PATENT DOCUMENTS

| | | | |
|---|---|---|---|
| 3,995,615 A * | 12/1976 | Hojnowski | .................... 126/670 |
| 3,996,918 A | 12/1976 | Quick | |
| 4,085,728 A | 4/1978 | Tomchak | |
| 4,224,927 A | 9/1980 | Patil | |
| 4,278,072 A | 7/1981 | Ryan | |
| 4,387,703 A | 6/1983 | Poole et al. | |
| 4,688,752 A | 8/1987 | Barteck | |
| 6,792,938 B2 | 9/2004 | Komano | |
| 6,807,963 B1 | 10/2004 | Niedermeyer | |
| 6,912,816 B2 | 7/2005 | O'Leary | |
| 7,032,588 B2 | 4/2006 | Hollick | |
| 7,077,124 B2 | 7/2006 | Szymocha | |
| 7,484,507 B2 | 2/2009 | Nikiforov | |
| 7,677,243 B2 | 3/2010 | McClendon | |
| 7,870,855 B2 | 1/2011 | Flaherty | |
| 2002/0117166 A1 | 8/2002 | Okumura | |
| 2003/0131623 A1 | 7/2003 | Suppes | |
| 2005/0061312 A1 | 3/2005 | Szymocha | |
| 2005/0252507 A1 | 11/2005 | Hollick | |
| 2007/0186922 A1 | 8/2007 | Guenter | |
| 2010/0147290 A1 | 6/2010 | Kunczynski | |
| 2010/0313876 A1 | 12/2010 | Palmieri | |

FOREIGN PATENT DOCUMENTS

JP    2001-311564 A    11/2001

OTHER PUBLICATIONS

International Search Report & Written Opinion in PCT/US2012/027108 mailed Sep. 25, 2012, 8 pages.

* cited by examiner

*Primary Examiner* — Alfred Basichas
(74) *Attorney, Agent, or Firm* — Merchant & Gould P.C.

(57) ABSTRACT

A solar heater for space heating is formed by a frame that provides structural support for a plate that absorbs sunlight. In one aspect, the plate is directly molded into the frame. In another aspect, the plate is incorporated into an assembly which is then sealed to the frame. The solar heater is configured such that multiple similarly configured solar heaters may be coupled together in a series and/or parallel arrangement.

19 Claims, 40 Drawing Sheets

SOLAR HEATER

BACKGROUND

Finite fossil fuel resources, coupled with ever-increasing global climate concerns, are stimulating the development and improvement of devices that utilize renewable energy. An example of such a device includes a solar heater for space heating. It is generally desirable that such devices operate under a wide range of weather conditions, as well as properly function to heat spaces that are traditionally not fully climate controlled, such as a garage or shed. Additionally, such devices should be durable and capable of providing heat for an extended time period without incurring large and/or excessive up-front installation or on-going maintenance costs.

SUMMARY

In one aspect, a solar heater for space heating is disclosed. The solar heater includes a collector assembly including a metallic plate, a cover formed of a material transparent to electromagnetic radiation, and a sealing assembly. The plate and the cover are framed by the sealing assembly and a sealed volume is formed between the plate and the cover. The solar heater also includes a housing coupled to the collector assembly and forming a seal. A conduit is formed between the plate and the housing and is in fluid connection with an external space by at least one aperture formed within the housing. The solar heater is configured for space heating by transmitting electromagnetic radiation incident on the cover to the plate through the sealed volume, and a working fluid within the conduit is heated by convective heat transfer from the plate and exhausted as a heated outlet fluid through the at least one aperture.

In another aspect, a solar heater assembly is disclosed. The solar heater assembly includes a frame including a plate; a polycarbonate panel formed of a material transparent to electromagnetic radiation, and a sealing assembly formed of at least one gasket supported by a rigid bracket. The plate and the panel are framed by the sealing assembly and a sealed volume is formed between the plate and the panel. The solar heater assembly also includes a housing coupled to the frame and forming a seal. A conduit is formed between the plate and the housing and is in fluid connection with a space external the housing by at least one aperture formed within the housing. The solar heater assembly further includes a rigid molding coupled to the housing and securing the frame to the housing. The solar heater assembly is configured for space heating by transmitting electromagnetic radiation incident on the panel to the plate through the sealed volume, and a fluid within the conduit is heated by forced convective heat transfer from the plate and exhausted as a heated fluid into the space external the housing through the at least one aperture.

In yet another aspect, a method for assembling a solar heater configured for space heating is disclosed. The method includes forming a collector assembly including a metallic plate, a polycarbonate panel, and a sealing assembly. The plate and the panel are framed by the sealing assembly and a sealed volume is formed between the plate and the panel. The method also includes forming a housing comprising forming an exterior section of the housing by rotational molding and injecting an insulating foam into an interior section of the housing. Corrugations and posts are formed on the exterior section of the housing. The method further includes coupling the collector assembly to the housing forming a seal. A conduit is formed between the plate and the housing and is in fluid connection with a space external the housing by at least one aperture formed within the housing, and the corrugations and the posts formed on the exterior casing of the housing promote turbulent fluid flow within the conduit. The method still further includes coupling a rigid molding to the housing securing the sealing assembly to the housing. The solar heater is configured for space heating by transmitting electromagnetic radiation incident on the panel to the plate through the sealed volume, and a working fluid within the conduit is heated by convective heat transfer from the plate and exhausted as a heated outlet fluid through the at least one aperture.

BRIEF DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is directed towards a solar heater for space heating. The example solar heater is generally formed by a frame that provides structural support for a plate that absorbs sunlight. In one embodiment, the plate is directly molded into the frame. In another embodiment, the plate is incorporated into an assembly which is then sealed to the frame. Additionally, the solar heater is configured such that multiple similarly configured solar heaters may be coupled together in a series and/or parallel arrangement. Although not so limited, an appreciation of the various aspects of the disclosure will be gained through a discussion of the examples provided below.

FIGS. 1-31 show components of an example first solar heater 102 according to the principles of the present disclosure.

Figure 1:
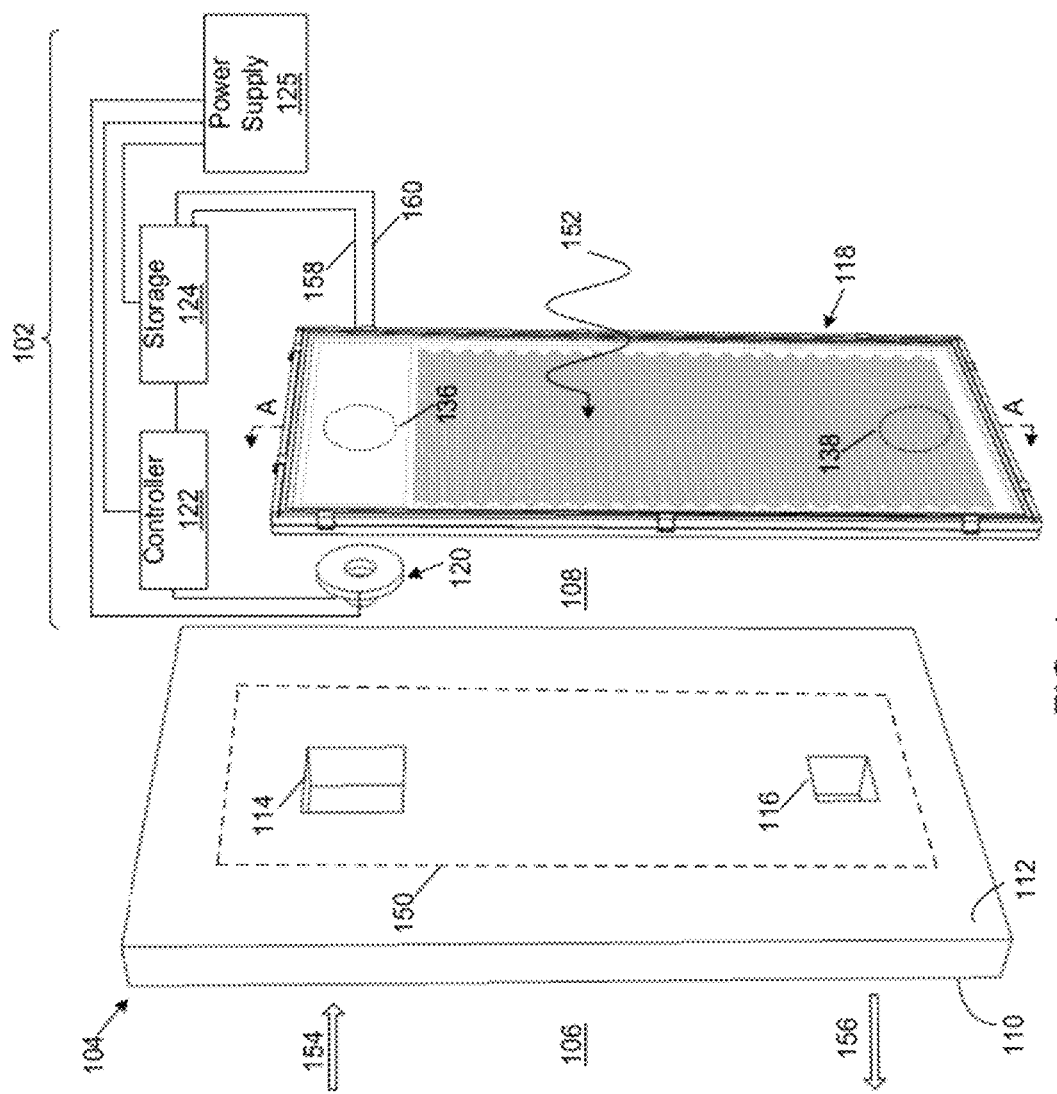
FIG. 1 shows a first example solar heater assembly.

FIG. 1 shows the solar heater 102 in relation to a portion of a support structure 104 of a commercial, industrial, or residential building. The support structure 104 separates a substantially enclosed interior volume 106 (e.g., living room, garage space, etc.) from a substantially open exterior volume 108 (e.g., outdoors) and includes an interior surface 110, an exterior surface 112, a first passage 114, and a second passage 116. As discussed in further detail below, the solar heater 102 includes a panel 118, a blower 120, a controller 122, and a storage unit 124. Other embodiments are possible. For example, the storage unit 124 and associated hardware may optionally be omitted. Additionally, in some embodiments, the solar heater 102 includes a power generator 125 coupled to one or more of the blower 120, controller 122, and storage unit 124. In general, the power generator 125 may draw from a mains power supply and/or generate its own power via any of a number of methods (e.g., photovoltaic, thermoelectric, etc.) Still other embodiments are possible.

Figure 2:
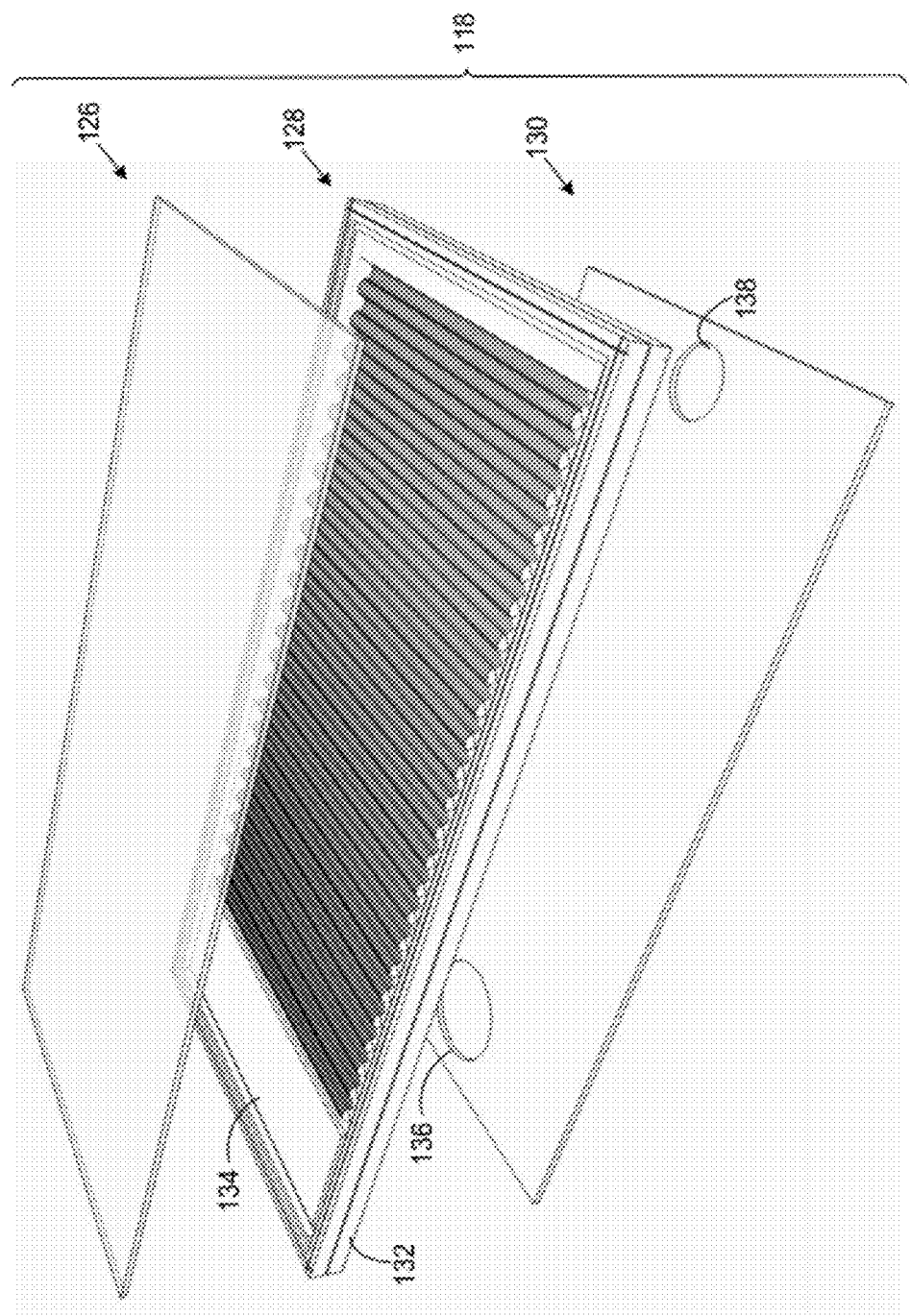
FIG. 2 shows an exploded view of an example panel of the assembly of FIG. 1.

FIG. 2 shows an exploded view of the panel 118 of FIG. 1. The panel 118 includes a front cover 126, a collector 128, and a back cover 130. The collector 128 includes a collector frame 132 and a collector plate 134. The back cover 130 includes a first aperture 136 and a second aperture 138. The first and second aperture 136, 138 being depicted by intermittent lines in FIG. 1.

The first aperture 136 and second aperture 138 are depicted as formed as a round or oval opening within the back cover 130. Other geometries and/or patterns of the first aperture 136 and second aperture 138 are possible such as, for example, rectangular apertures, multiple periodic apertures, omission, etc.

Figure 3:
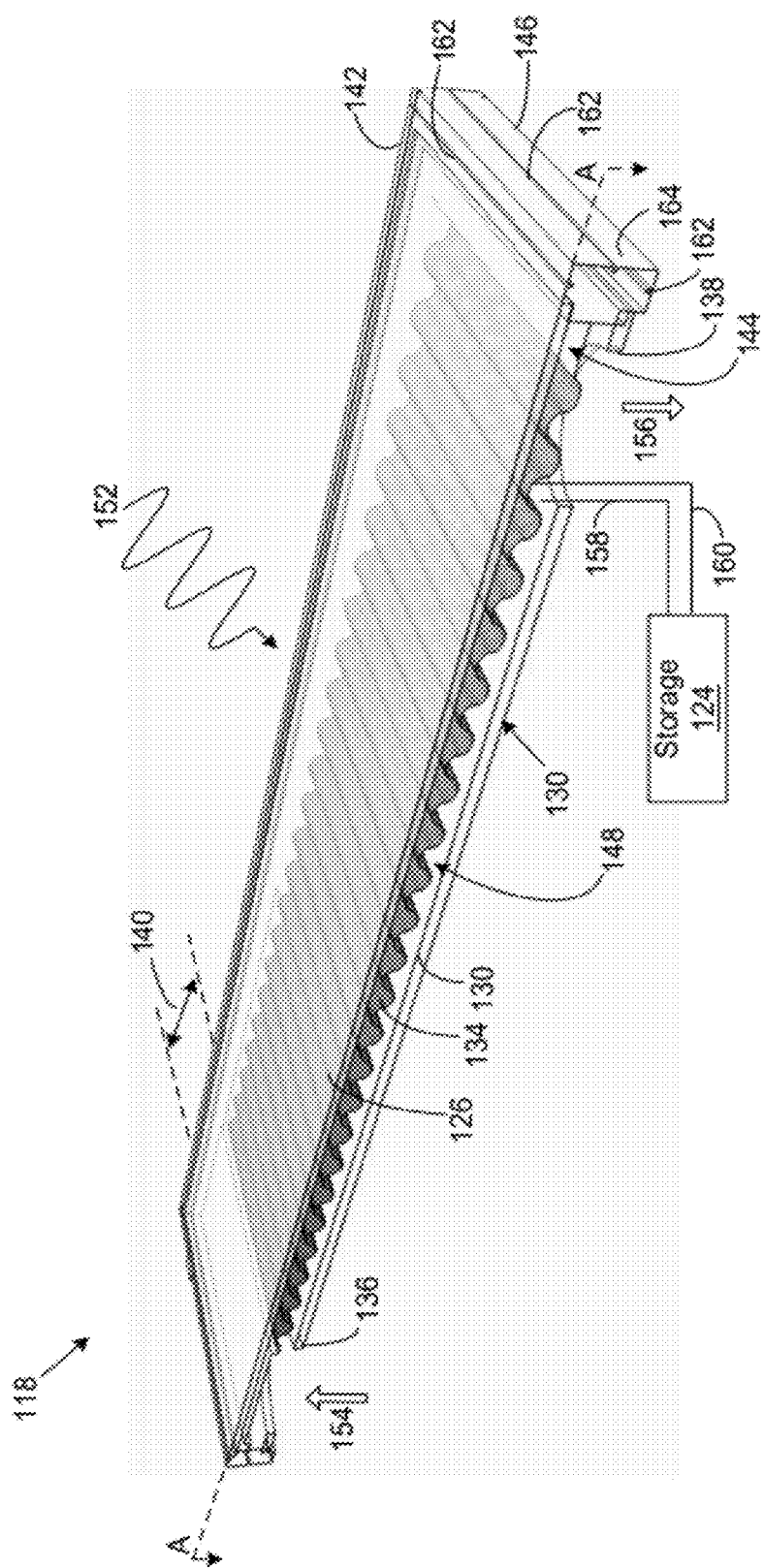
FIG. 3 shows a cross-sectional view of the panel of FIG. 2.
Figure 4:
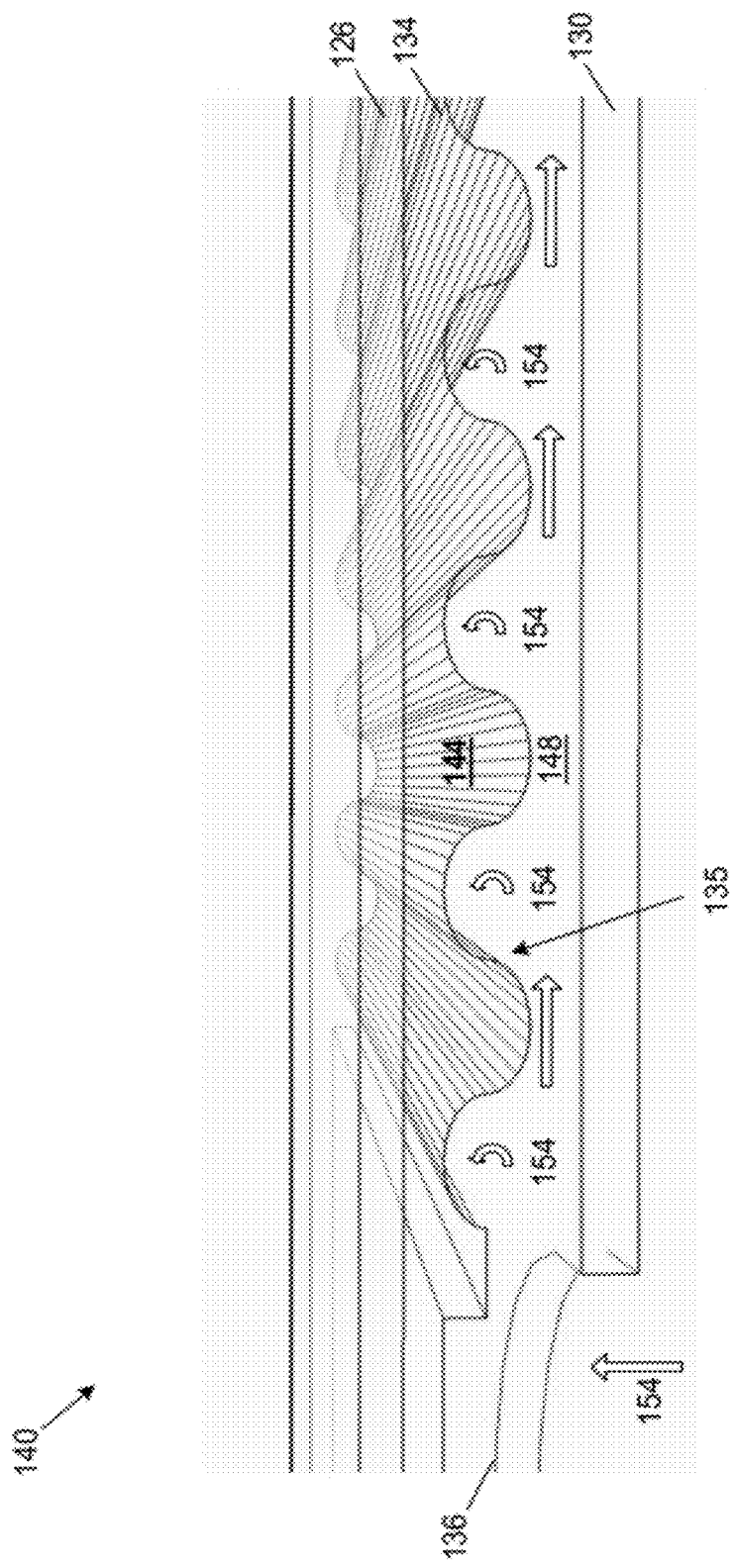
FIG. 4 shows a segment of the cross-sectional view of FIG. 3.

FIG. 3 shows a cross-section A-A (i.e., FIG. 1) of the panel 118. FIG. 4 shows a segment 140 of the panel cross-section of FIG. 3. As described in further detail below, the collector plate 134 is integrally formed within the collector frame 132. In this manner, when the front cover 126 is positioned and coupled to a front side 142 of the panel 118, a sealed volume 144 is formed between the collector plate 134 and the front cover 126. Additionally, when the back cover 130 is positioned and coupled to a back side 146 of the panel 118, an open fluid conduit 148 is formed between the collector plate 134 and the back cover 130.

The solar heater 102 is a single pass, flow-behind solar heater configured for heating the interior volume 106. The blower 120 is coupled and sealed to the first aperture 136. The panel 118 is coupled and sealed to the exterior surface 112 of the support structure 104 at a mounting location 150 (i.e., FIG. 1). The panel 118 is positioned to the mounting location 150 such that the first and second passage 114, 116 are substantially or approximately aligned with the respective first and second aperture 136, 138. In this manner, the conduit 148 is in fluid connection with the interior volume 106. It will be appreciated that the panel 118 may be mounted in any desirable position and angular orientation with respect to the support structure 104 to maximize radiation gain over seasonal changes and/or or account for decorative issues.

In use, solar radiation 152 impinges the front cover 126 and is transmitted to the collector plate 134 via the sealed volume 144 to heat the collector plate 134 The sealed volume 144 is optionally backfilled with pressurized fluid (e.g., air, inert gas, etc.) and the collector plate 134 is optionally coated to maximize absorptivity and minimize emissivity. One example coating includes the SOLKOTE HI/SORB-II coating from SOLEC® Corporation. Another example coating(s) includes selective absorber layers from TiNOX® Energy. In the example embodiment, the collector plate 134 itself is formed as an aluminum or copper substrate. Still other embodiments are possible.

The controller 122 is coupled to the blower 120. When the collector plate 134 reaches a predetermined temperature, the controller 122 actuates the blower 120 to draw inlet air 154 from the interior volume 106 into the conduit 148. The inlet air 154 is heated by the collector plate 134 via forced convection and is exhausted as heated outlet air 156 into the interior volume 106. In some embodiments, the controller 122 actuates the blower 120 when a temperature difference as measured between a predetermined section of the solar heater 102 (e.g., collector plate 134, conduit 148, etc.) and the interior volume 106 exceeds a predetermined value (e.g., 5° Celsius, etc.). Still other embodiments are possible.

The controller 122 is configured to adjust speed of the blower 120 as more or less heat becomes available from the collector plate 134. The controller 122 is additionally coupled to the storage unit 124, which in turn is coupled directly or indirectly to the collector plate 134 and/or the conduit 148 either through the panel 118 and/or via the second aperture 138 (i.e., FIG. 1 and FIG. 3). The storage unit 124 is configured to draw and store heat via a conduit connection 158 and/or a collector plate connection 160 based on an input as provided by the controller 122.

The front cover 126 is a polycarbonate panel optimized for maximum transmissive and insulative properties. MAKROLON® glazing by Bayer MaterialScience is one example of a twin-wall polycarbonate panel. Twin-wall construction of the front cover 126, in tandem with the sealed volume 144, provides multiple layers of insulation between the exterior volume 108 and the conduit 148. Such a configuration beneficially maximizes heat transfer from the collector plate 134 to the inlet air 154, and further minimizes undesirable radiative heat loss from the respective components of the panel 118. Other embodiments of the front cover 126 are possible.

The collector plate 134 is a metal plate (e.g., galvanized sheet metal, aluminum, etc.) and is formed with a corrugation 135 (i.e., FIG. 4) to promote turbulent air flow within the conduit 148 and facilitate maximum heat transfer from the collector plate to the inlet air 154. The corrugation 135 provides additional surface area, in comparison to other geometries, such that an increased solar radiation flux strikes the collector plate 134. The corrugation 135 may be formed by any process such as stamping, rolling press, etc. Other methods of forming the collector plate 134 including various types of turbulence promoting/enhancing formations are possible, such as described below with respect to FIGS. 5-10.

The collector frame 132 is a plastic material formed via a molding process. One example molding process is a Reaction Injection Molding (RIM) process. Another example molding process includes a rotational molding process. The collector plate 134 is locked into the collector frame 132 as the collector frame 132 is formed via the injection molding process. In this manner, the collector plate 134 is integrally formed with the collector frame 132. The collector frame 132 is additionally formed to include a fastener recess 162 on each of the front side 142, back side 146, and an edge surface 164 (i.e., FIG. 3). Other embodiments and methods of forming the collector frame 132 are possible.

The back cover 130 is a sheet of rigid material that is insulated to enhance thermal characteristics. One example of such a material is sheet metal coated with an insulative material. Other embodiments are possible. The back cover 130 is coupled and sealed to the collector frame 132 such that fluid connection to the conduit 148 is only established via the first and second aperture 136, 138, as mentioned above.

Referring now to FIGS. 5-10, examples of alternative turbulence enhancing features are shown formed on the collector plate 134 of the panel 118. Shape and geometry of the features are selected to facilitate maximum convective heat transfer from the collector plate 134 to the inlet air 154.

Figure 5:
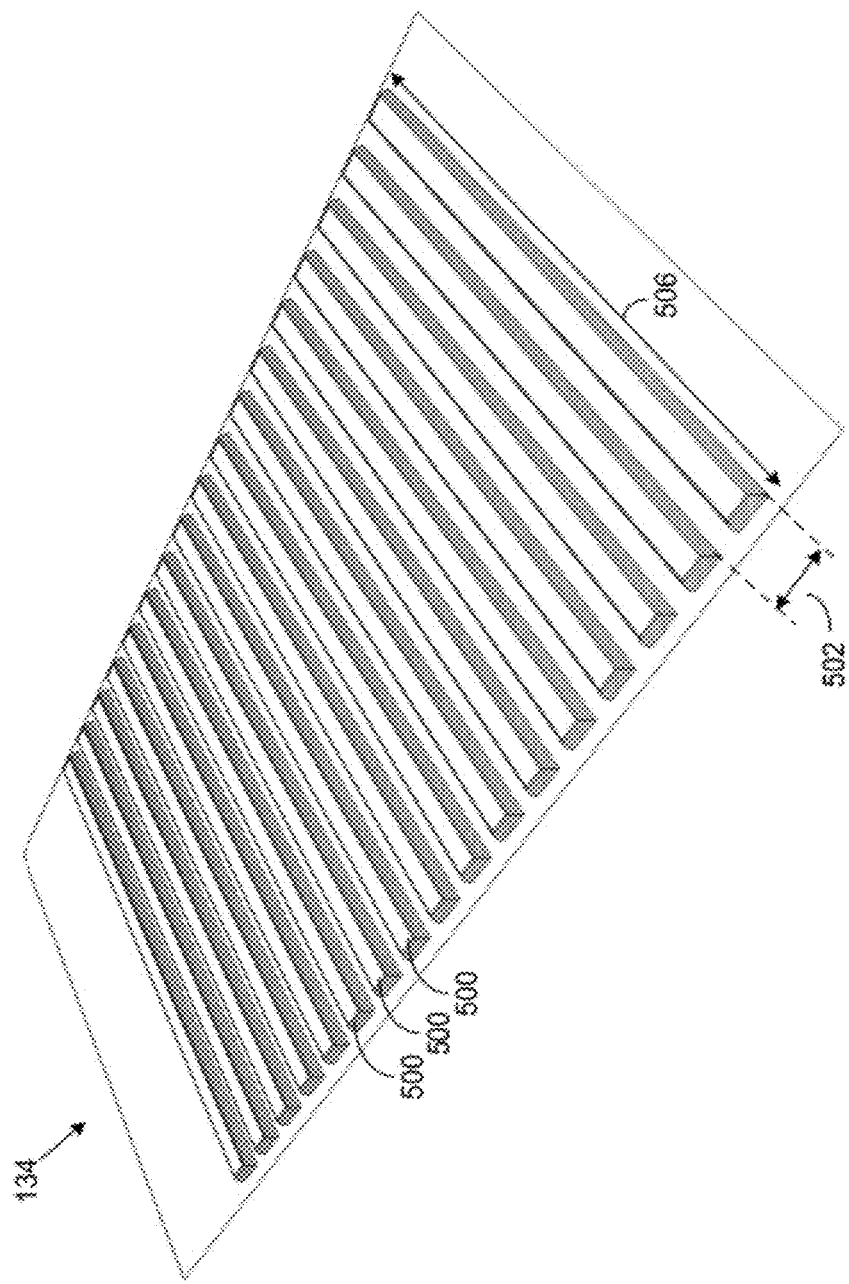
FIG. 5 shows a first view of an example collector plate of the assembly of FIG. 1.
Figure 6:
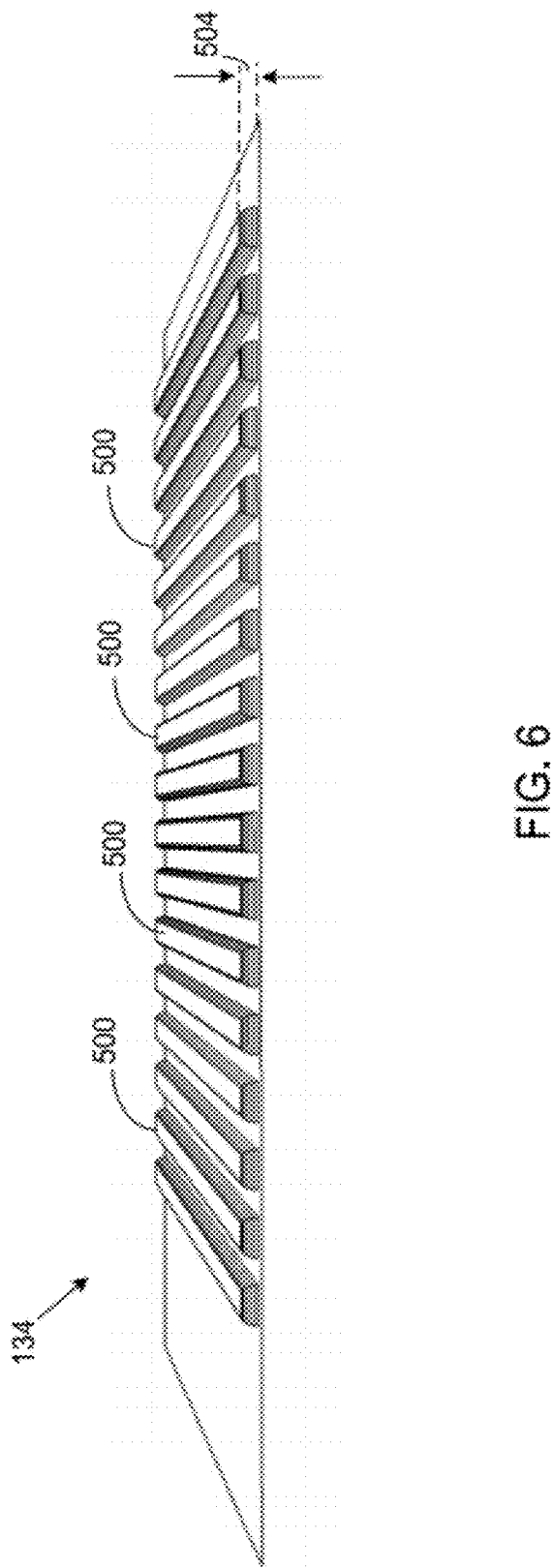
FIG. 6 shows a second view of the collector plate of FIG. 5.

FIG. 5 shows a first perspective view of the collector plate 134 including a plurality of bar-shaped protuberances 500. FIG. 6 shows a second perspective view of the collector plate 134 of FIG. 5. The bar-shaped protuberances 500 are formed periodically at a first pitch 502 and are each defined by a bar length 504 and a bar height 506.

Figure 7:
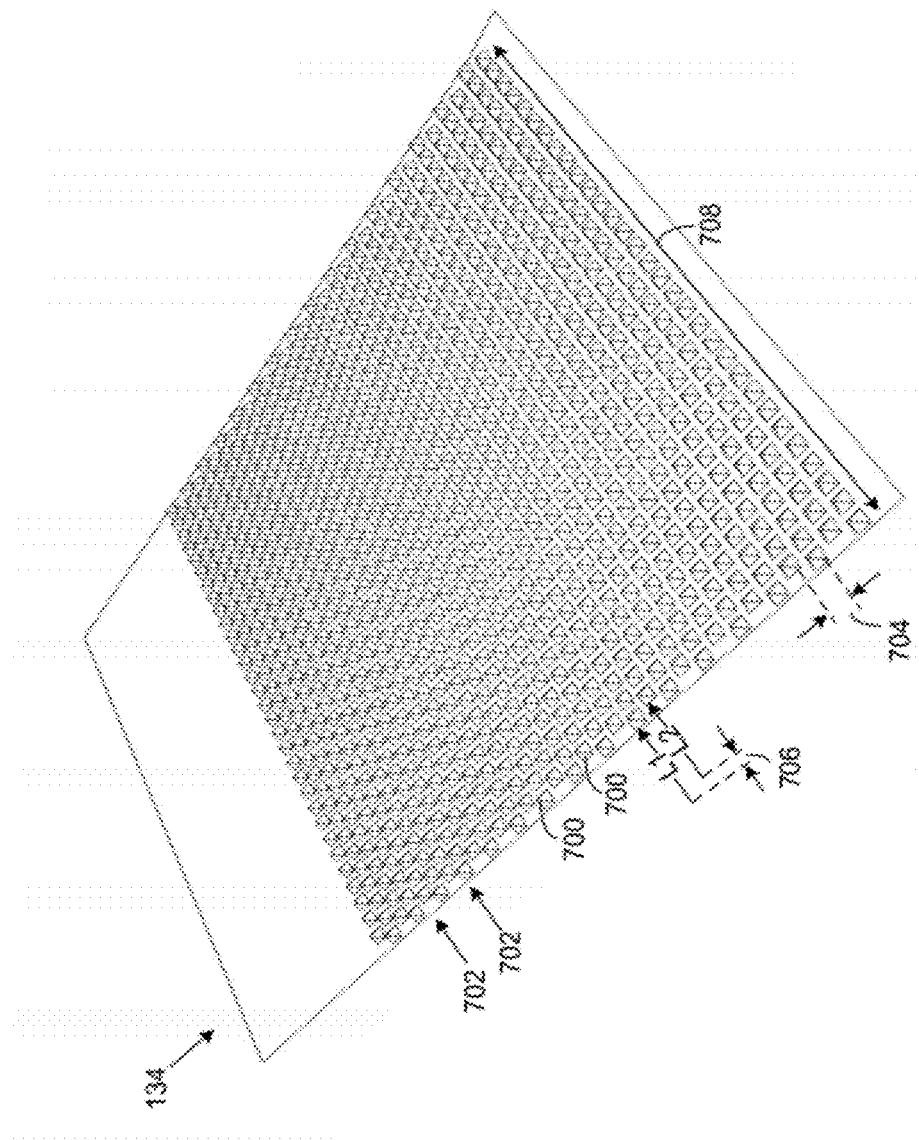
FIG. 7 shows a first view of another example collector plate of the assembly of FIG. 1.
Figure 8:
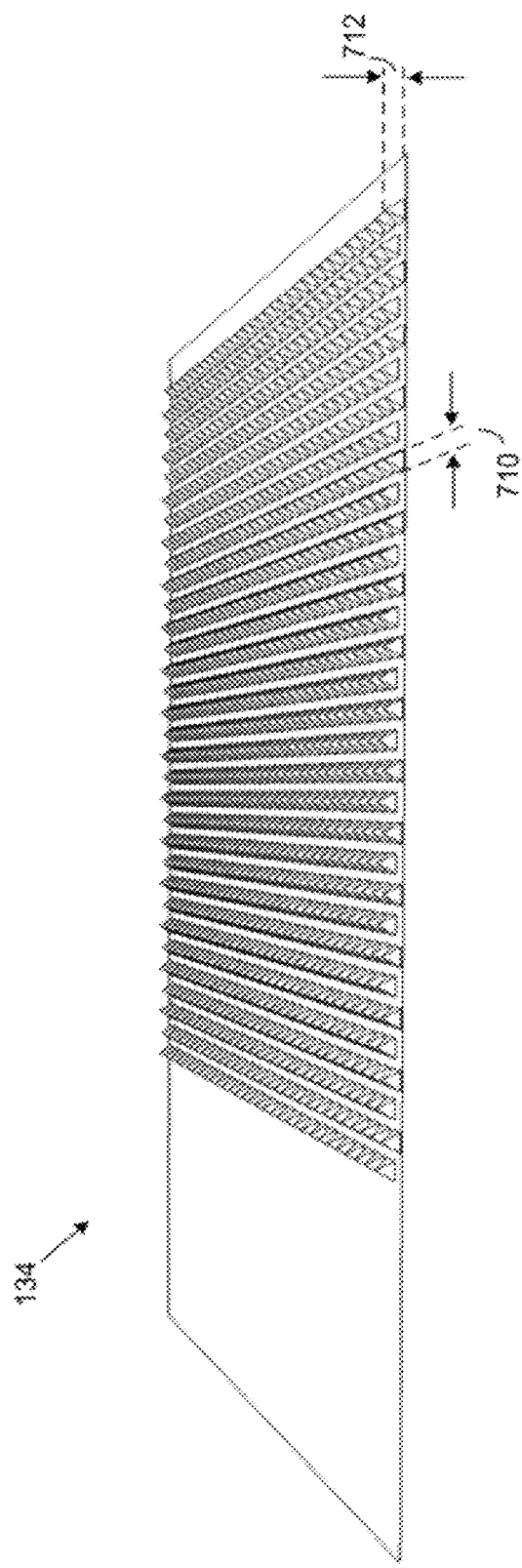
FIG. 8 shows a second view of the collector plate of FIG. 7.

FIG. 7 shows a first perspective view of the collector plate 134 including a plurality of first pyramidal-shaped protrusions 700. FIG. 8 shows a second perspective view of the collector plate 134 of FIG. 7. The first pyramidal-shaped protrusions 700 are arranged in a first plurality of rows 702. The first plurality of rows 702 are formed periodically at a second pitch 704 in which each of the respective rows is/are offset a first distance 706 with respect to nearest adjacent rows. Each of the first plurality of rows 702 is defined by a first row length 708. Each first pyramidal-shaped protrusion 700 is defined by a first base length 710 and a first height 712.

Figure 9:
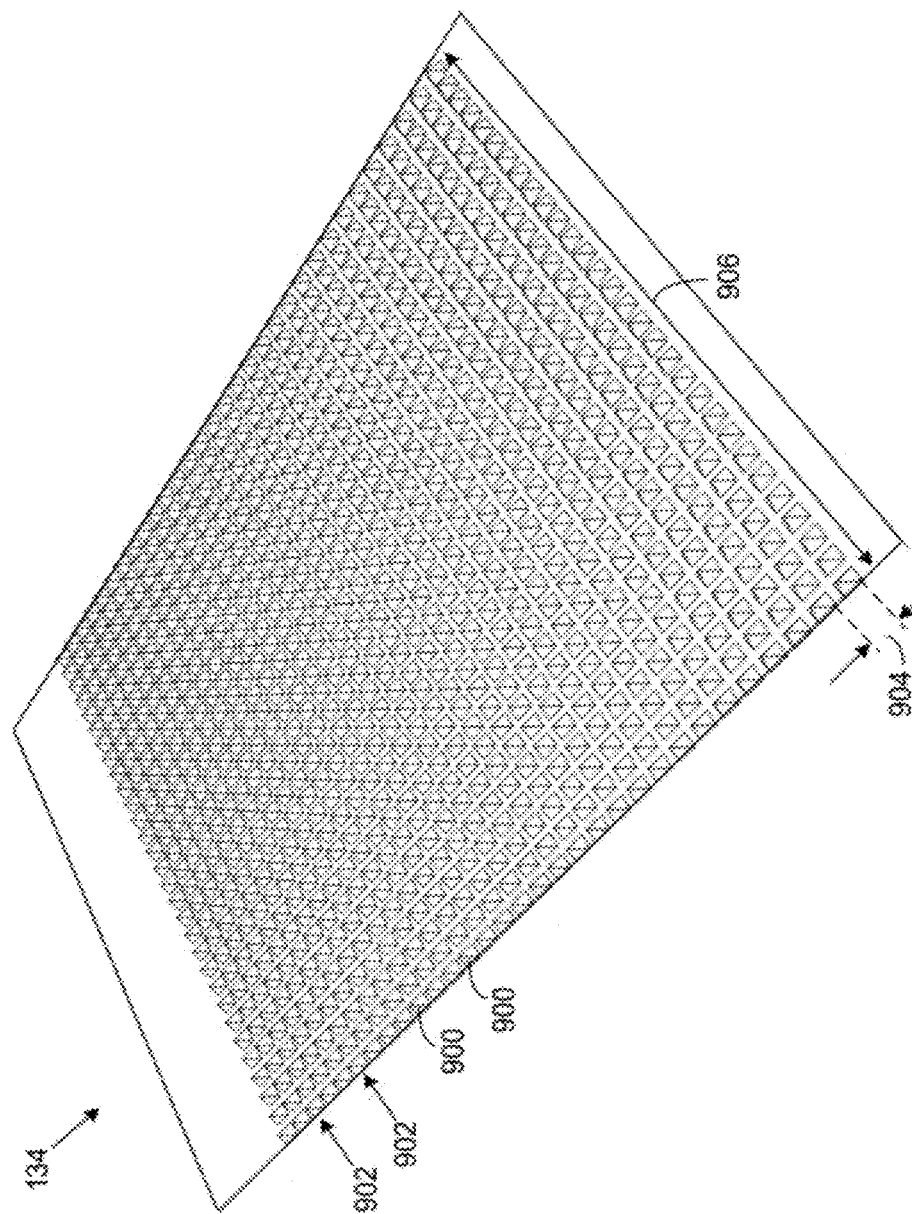
FIG. 9 shows a first view of a yet another example collector plate of the assembly of FIG. 1.
Figure 10:
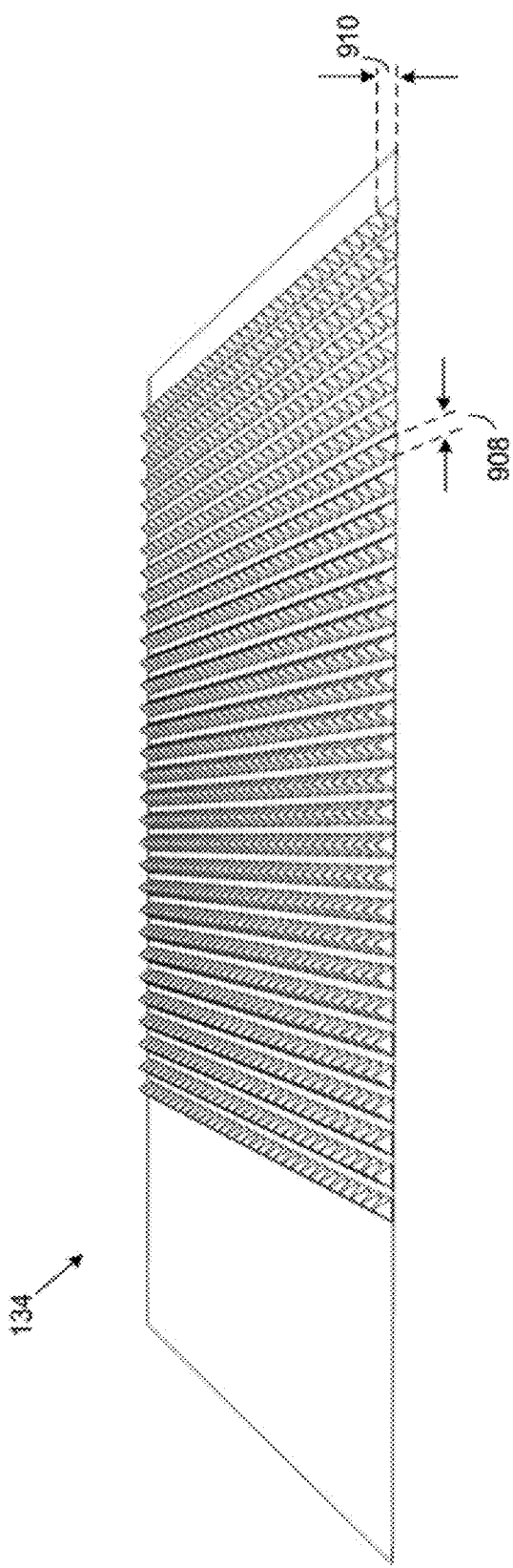
FIG. 10 shows a second view of the collector plate of FIG. 9.

FIG. 9 shows a first perspective view of the collector plate 134 including a plurality of second pyramidal-shaped protrusions 900. FIG. 10 shows a second perspective view of the collector plate 134 of FIG. 9. The second pyramidal-shaped protrusions 900 are arranged in a second plurality of rows 902. The second plurality of rows 902 are formed periodically at a third pitch 904. Each of the second plurality of rows 902 is defined by a second row length 906. Each second pyramidal-shaped protrusion 900 is defined by a second base length 908 and a second height 910.

Referring now to FIGS. 11-18, the panel 118 is shown including various attachments and structure of a modified collector frame 1100. The collector frame 1100 is similar to the collector frame 132 described above and is configured to facilitate series and/or parallel connection of the panel 118 with one or more other similarly configured panels.

Figure 11:
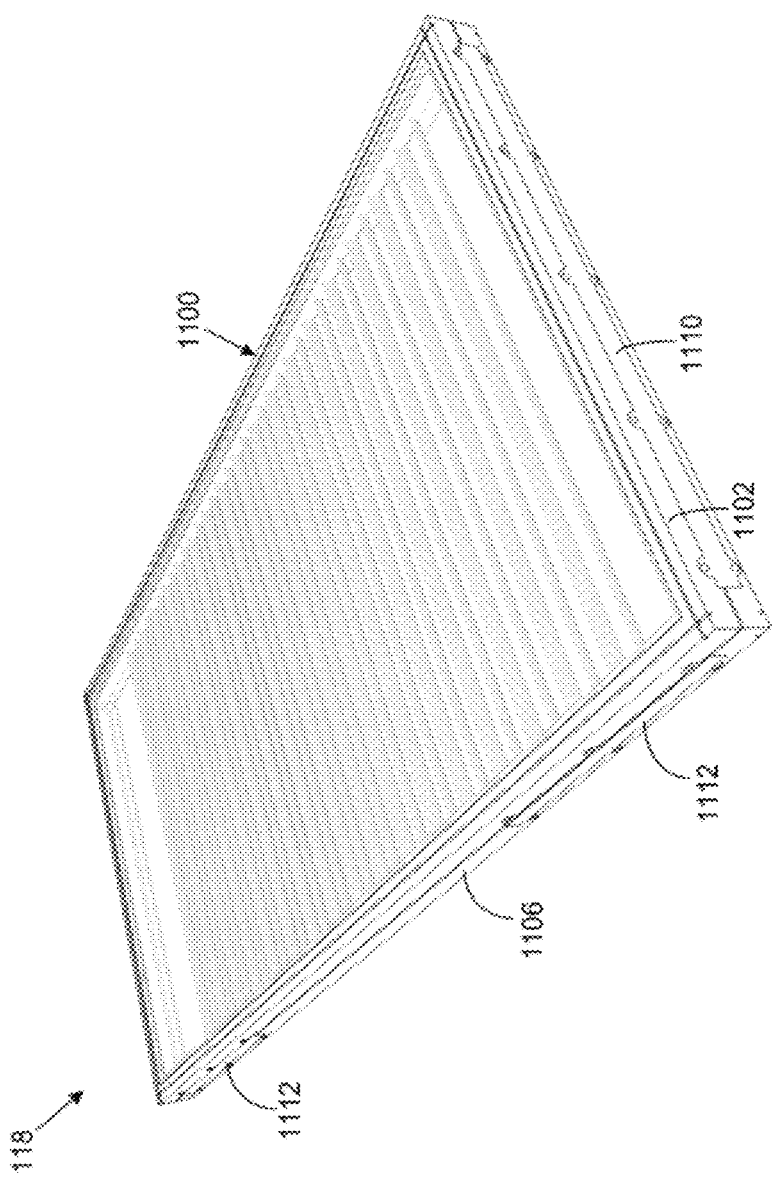
FIG. 11 shows a first view of a second example solar heater assembly.
Figure 12:
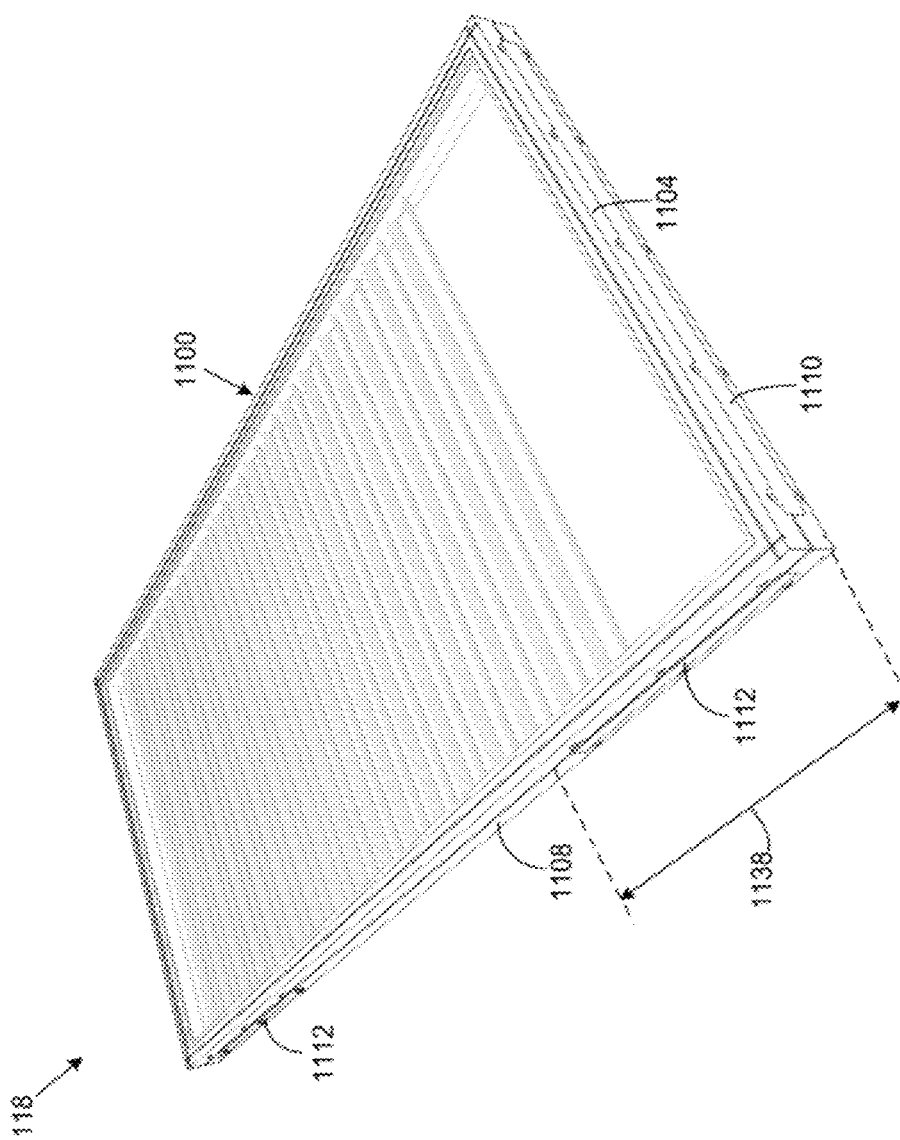
FIG. 12 shows a second view of the assembly of FIG. 11.

FIG. 11 shows a first perspective view of the panel 118 with the collector frame 1100. FIG. 12 shows a second perspective view of the panel 118 of FIG. 11. The collector frame 1100 includes a first end surface 1102, a second end surface 1104, a first side surface 1106, and a second side surface 1108. In example embodiments, the collector frame 1100 is formed of a plastic material via an injection molding process. Other embodiments are possible.

As depicted in FIGS. 11 and 12, a removable end cap 1110 is positioned within each of the first end surface 1102 and the second end surface 1104. Additionally, a removable side cap 1112 is positioned at opposite ends and within each of the first side surface 1106 and the second side surface 1108. When respective caps 1110, caps 1112 are positioned to the collector frame 1100, the collector frame 1100 may be incorporated into the solar heater 102 for heating the interior volume 106 as described above with respect to FIGS. 1-4.

Figure 13:
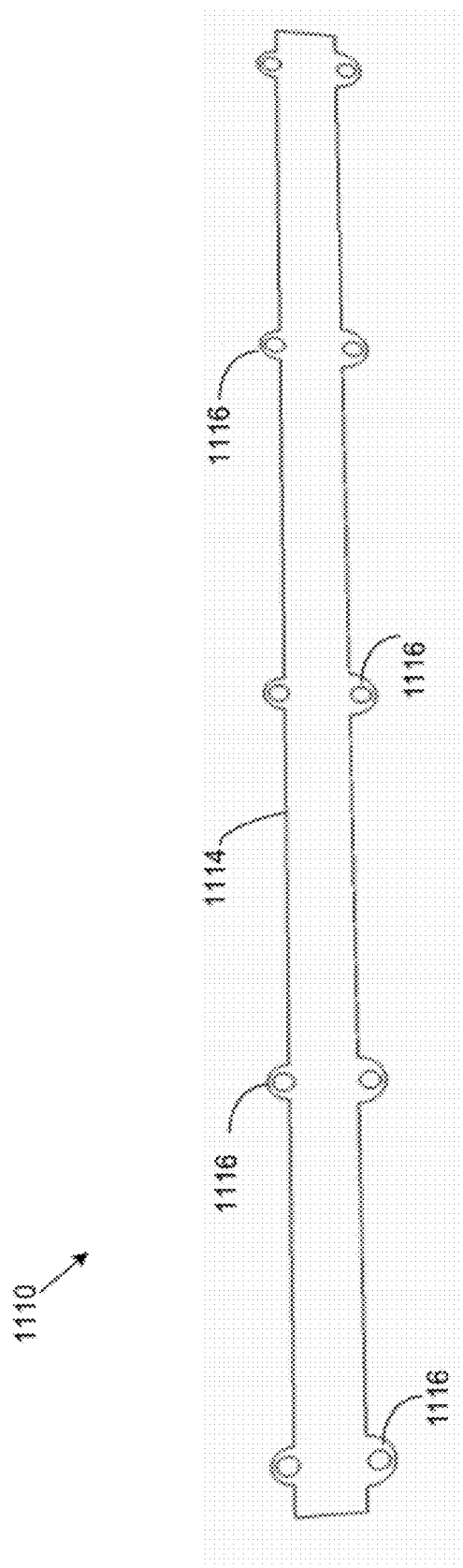
FIG. 13 shows a first view of a removable end cap.
Figure 14:
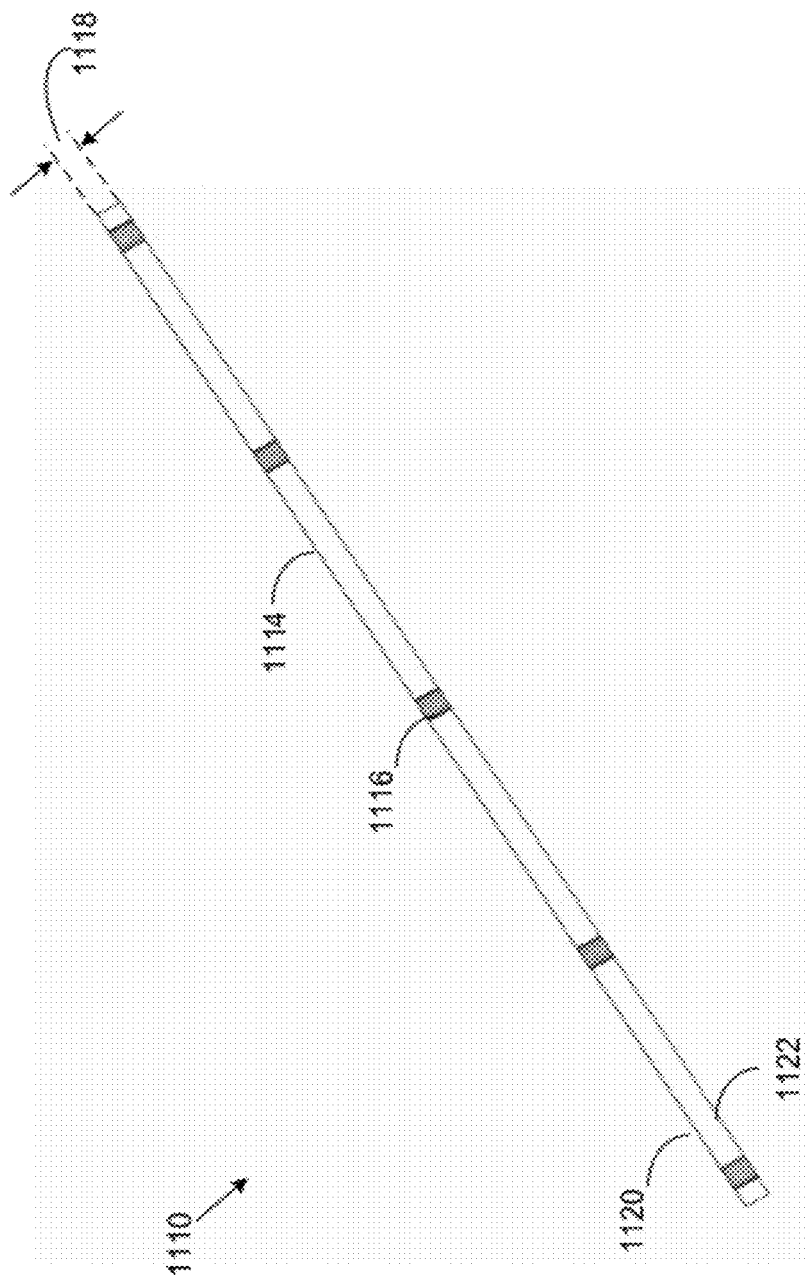
FIG. 14 shows a second view of the end cap of FIG. 13.

FIG. 13 shows the end cap 1110 of FIGS. 11 and 12. FIG. 14 shows a top view of the end cap 1110 of FIG. 13. The end cap 1110 includes a solid end body 1114, a plurality of end fastener eyelets 1116, and is formed having a first width 1118 defined by an inner end surface 1120 and an outer end surface 1122.

Figure 15:
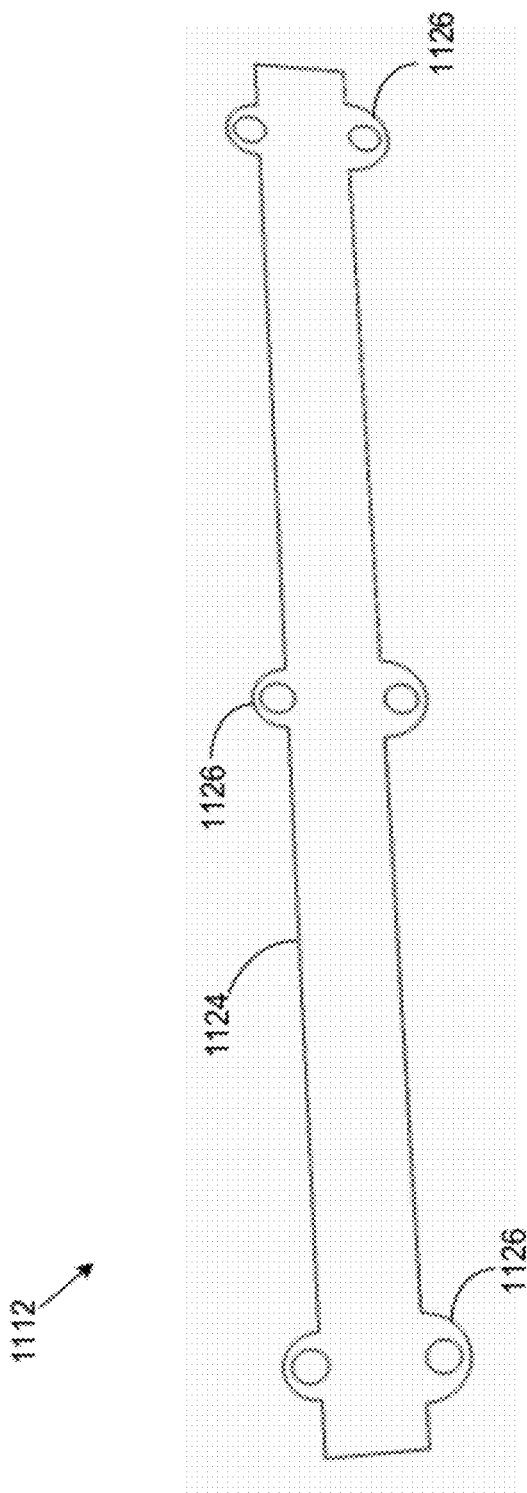
FIG. 15 shows a first view of a removable side cap.
Figure 16:
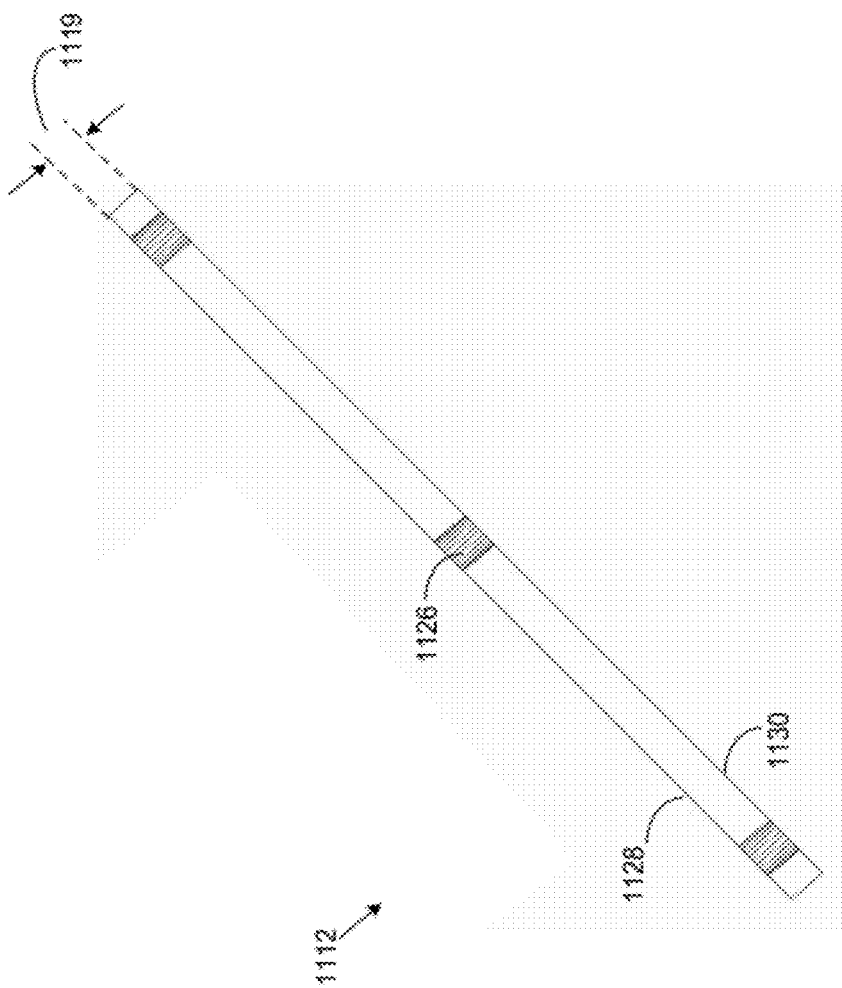
FIG. 16 shows a second view of the side cap of FIG. 15.

FIG. 15 shows the side cap 1112 of FIGS. 11 and 12. FIG. 16 shows a top view of the side cap 1112 of FIG. 15. The side cap 1112 includes a solid side body 1124, a plurality of side fastener eyelets 1126, and is formed having a second width 1119 defined by an inner side surface 1128 and an outer side surface 1130.

In example embodiments, the first width 1118 of the end cap 1110 of FIGS. 13 and 14 is approximately equal in width to the second width 1119 of the side cap 1112. Additionally, both the end cap 1110 and side cap 1112 of FIGS. 11-16 are formed of a plastic material via an injection molding process similar to the collector frame 1100.

Figure 17:
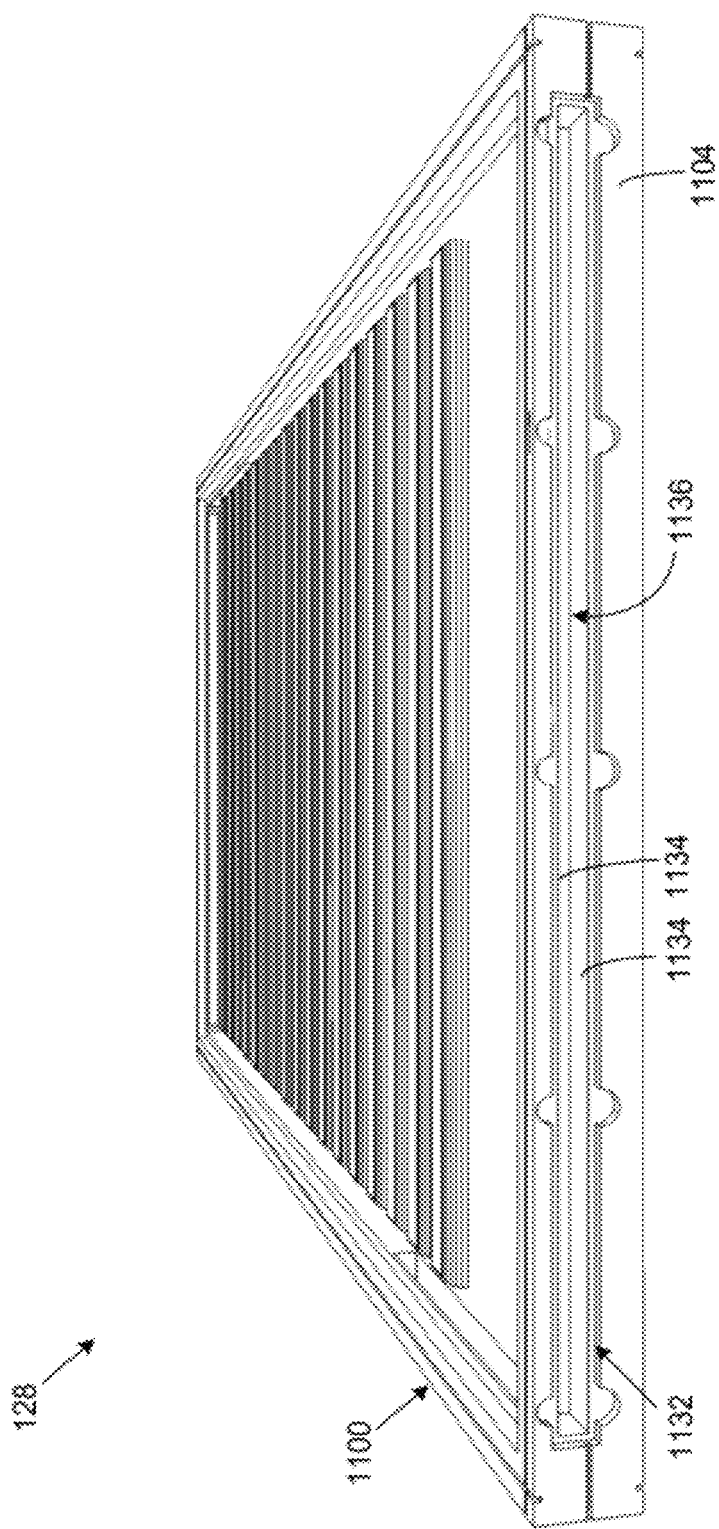
FIG. 17 shows a first view of an example collector frame.

FIG. 17 shows a perspective view of the collector frame 1100 of the panel 118 of FIGS. 11 and 12. The collector frame 1100 includes an end bridging aperture 1132 formed within the second end surface 1104 of the collector frame 1100. The end bridging aperture 1132 is defined by an inner end flange surface 1134 and an end vent 1136.

In example embodiments, an end cap 1110 is positioned within the second end surface 1104 (e.g., FIGS. 11 and 12) via the end bridging aperture 1132. For example, the solid end body 1114 of an end cap 1110 may be inserted to the end bridging aperture 1132 until the inner end surface 1120 of the end cap 1110 is in contact with the inner end flange surface 1134 of the end bridging aperture 1132. In this position, the outer end surface 1122 of the end bridging aperture 1132 is approximately flush with the second end surface 1104 of the collector frame 1100. A fastener may be positioned to each of the plurality of end fastener eyelets 1116 of the end cap 1110 and adjusted accordingly to secure the end cap 1110 to the collector frame 1100. A similar process may be used to secure an end cap 1110 to the first end surface 1102 of the collector frame 1100.

Figure 18:
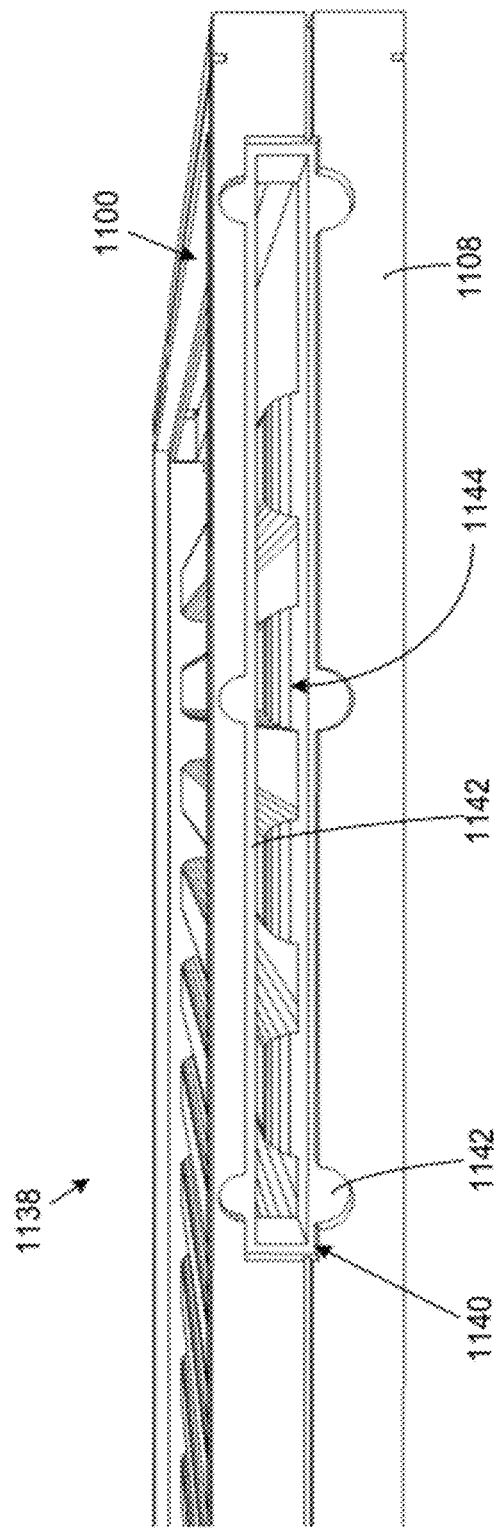
FIG. 18 shows a segmented view of the collector frame of FIG. 17.

FIG. 18 shows a segment 1138 of the collector frame 1100 of FIGS. 11 and 12. The segment 1138 shows a side bridging aperture 1140 formed within the second side surface 1108 of the collector frame 1100. The side bridging aperture 1140 is defined by an inner side flange surface 1142 and a side vent 1144.

In example embodiments, a side cap 1112 is positioned within the second side surface 1108 (i.e., FIGS. 11 and 12) via the side bridging aperture 1140. For example, the solid side body 1124 of a side cap 1112 may be inserted to the side bridging aperture 1140 until the inner side surface 1128 of the side cap 1112 is in contact with the inner side flange surface 1142 of the side bridging aperture 1140. In this position, the outer side surface 1130 of the side bridging aperture 1140 is approximately flush with the second side surface 1108 of the collector frame 1100. A fastener may be positioned to each of the plurality of side fastener eyelets 1126 of the side cap 1112 and adjusted accordingly to secure the side cap 1112 to the collector frame 1100. A similar process may be used to secure a plurality of the side caps 1112 to the first side surface 1106 and the second side surface 1108 of the collector frame 1100.

Referring now to FIGS. 19-23, a first panel 1900 and a second panel 1902, each configured similar to the panel 118 described above in connection with FIGS. 1-18, are shown arranged in a series configuration. When the first panel 1900 and the second panel 1902 are coupled together to form a series connected assembly 1904 (i.e., FIG. 22), the series connected assembly 1904 may be used for heating the interior volume 106 such as described above with respect to FIGS. 1-4.

Figure 19:
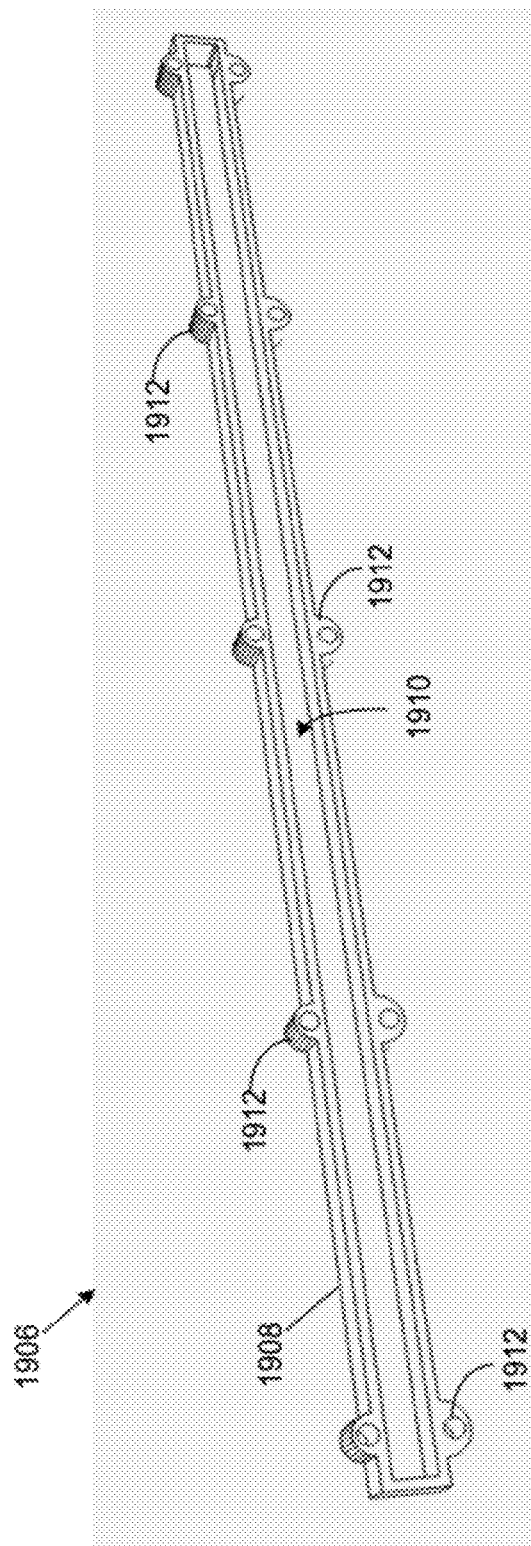
FIG. 19 shows a first view of an end vent molding.
Figure 20:
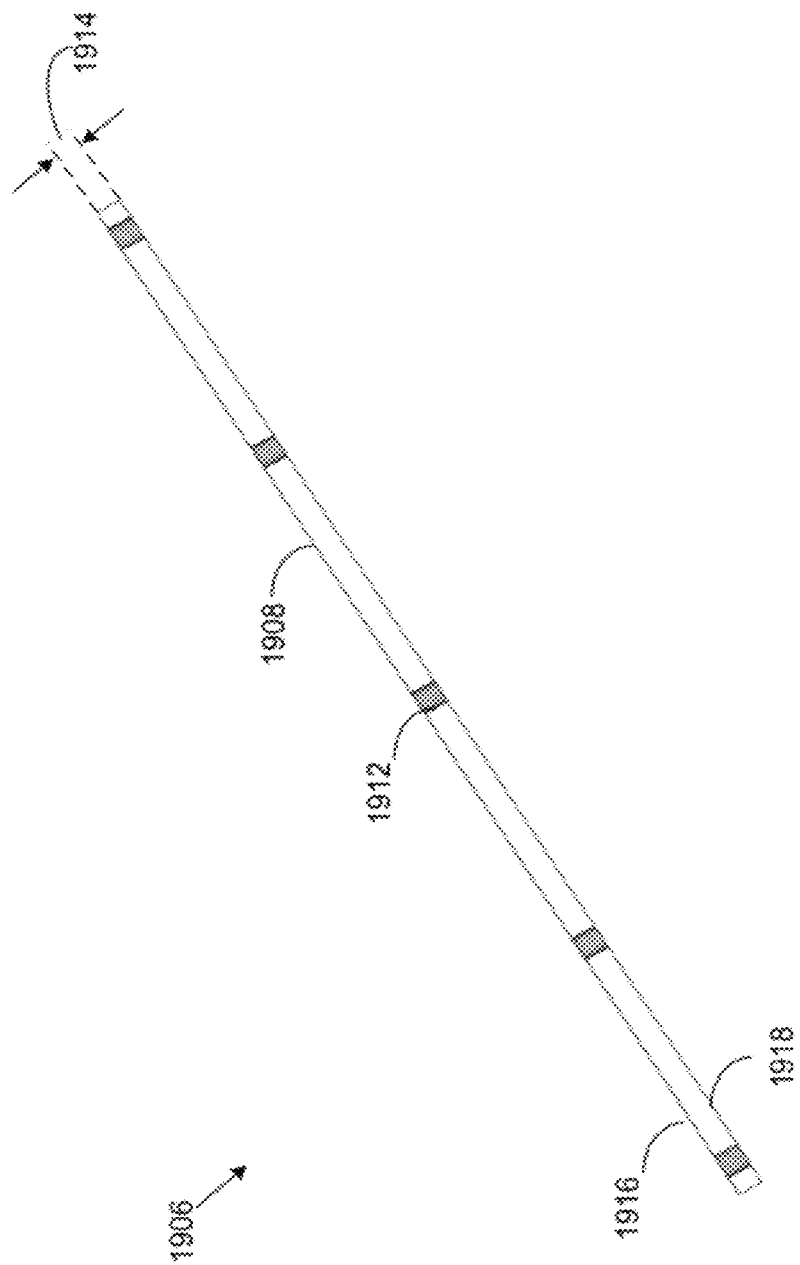
FIG. 20 shows a second view of the end vent molding of FIG. 19.

FIG. 19 shows an end vent molding 1906. FIG. 20 shows a top view of the end vent molding 1906 of FIG. 19. The end vent molding 1906 includes an end molding body 1908 defined by an end molding vent 1910 and a plurality of end molding fastener eyelets 1912. Additionally, the end vent molding 1906 is formed having a third width 1914 defined by an inner end surface 1916 and an outer end surface 1918. The third width 1914 of the end vent molding 1906 is approximately twice the first width 1118 of the end cap 1110 and the second width 1119 side cap 1112 described above, in part, with respect to FIGS. 13-16.

Figure 21:
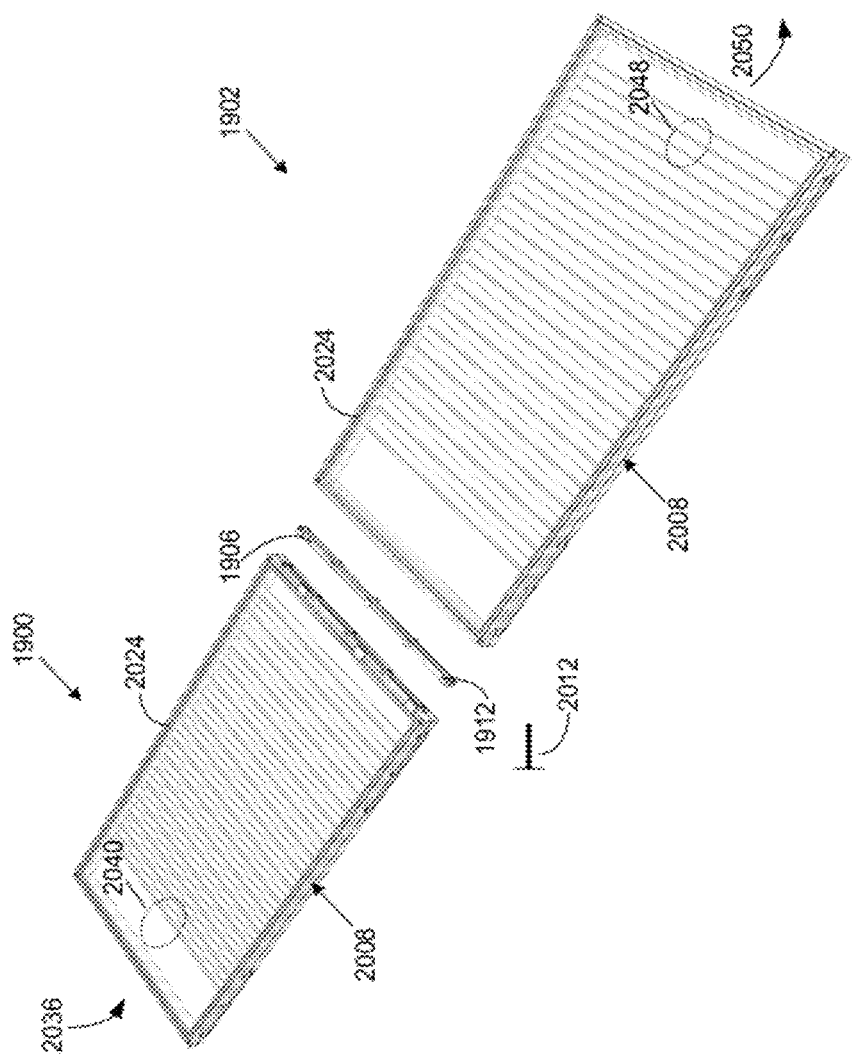
FIG. 21 shows a view of a first and second panel aligned in series.
Figure 22:
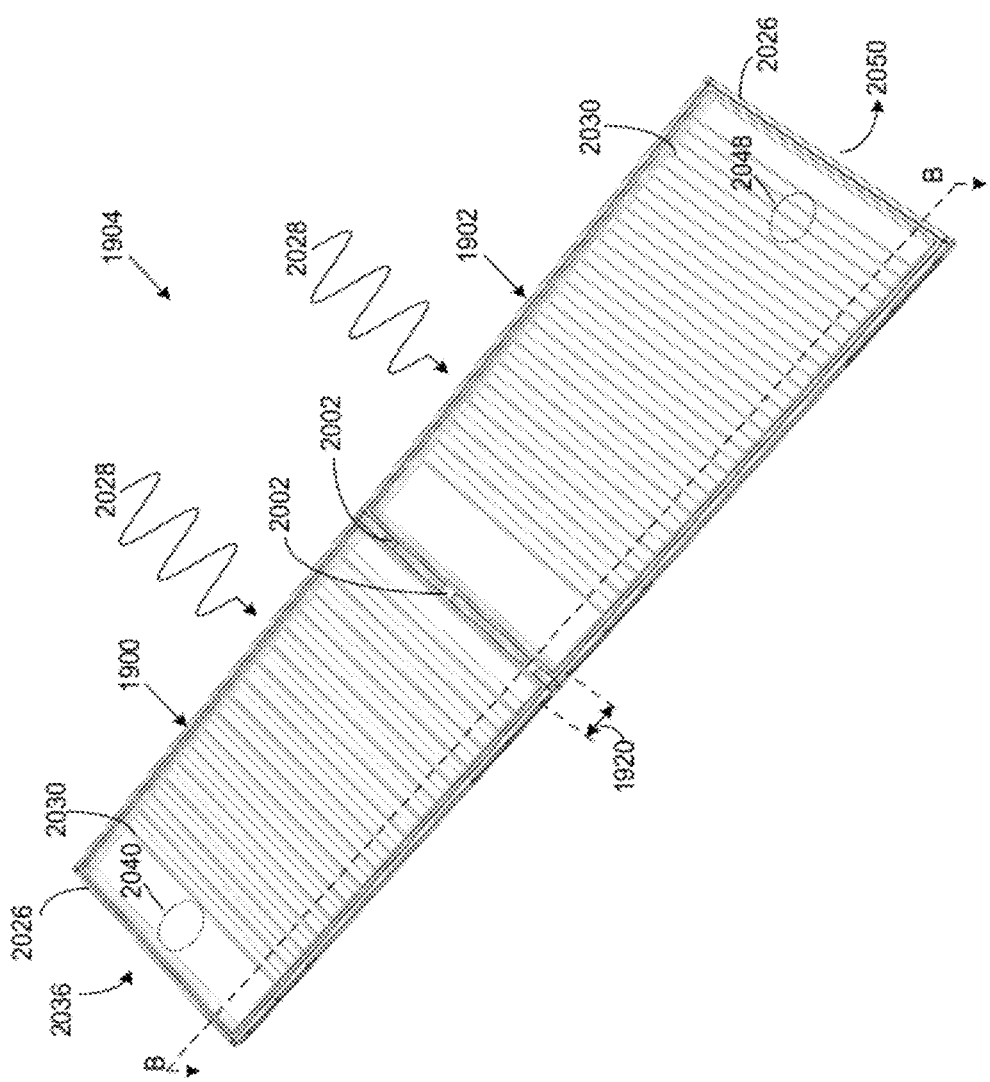
FIG. 22 shows the first and second panel of FIG. 21 coupled in series.
Figure 23:
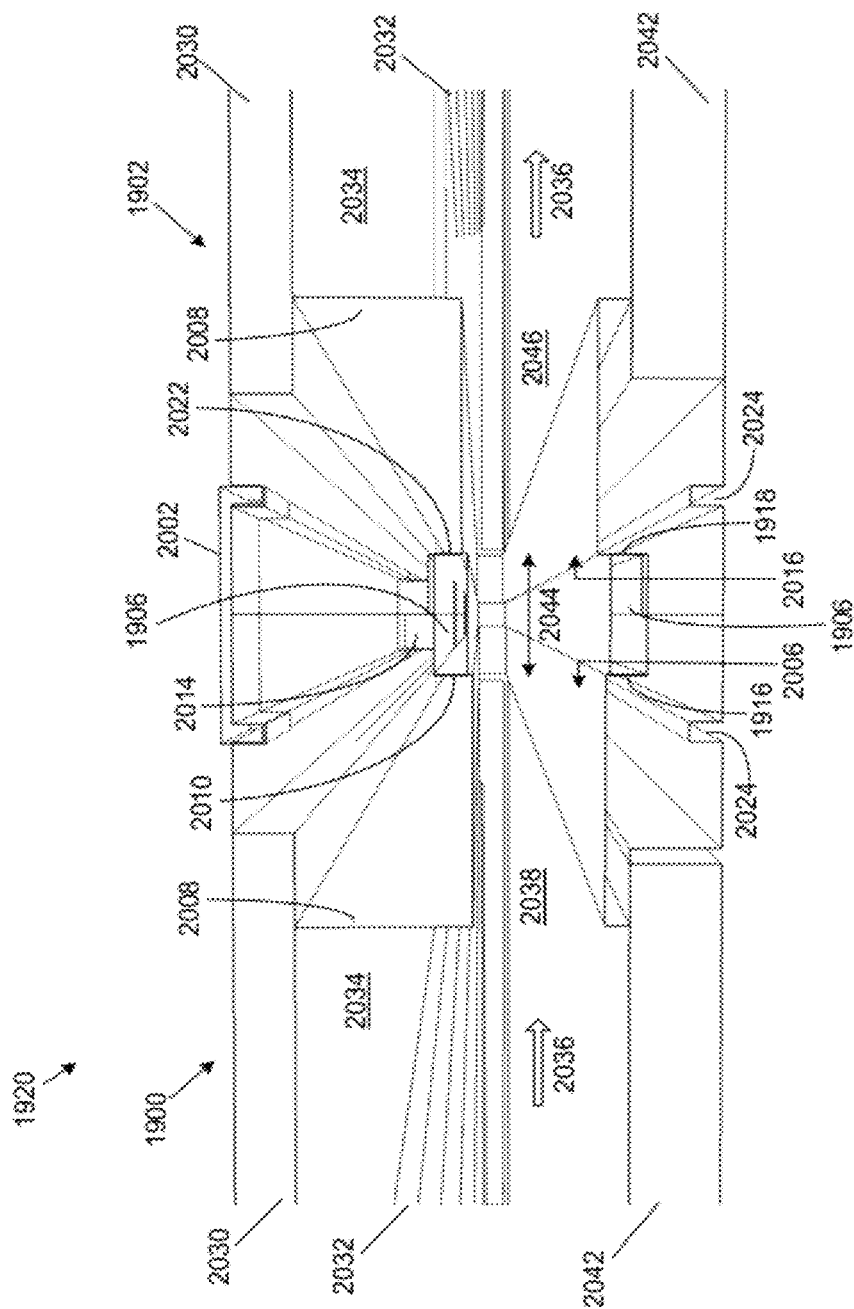
FIG. 23 shows a segmented cross-sectional view of FIG. 21.

FIG. 21 shows the first panel 1900 and the second panel 1902 aligned in a series configuration. FIG. 22 shows the first panel 1900 and the second panel 1902 coupled together to form the series connected assembly 1904. FIG. 23 shows a segment 1920 of a cross-section B-B of the series connected assembly 1904 of FIG. 22.

In general, an end vent molding 1906 (i.e., FIG. 19) and a plurality of retention clips 2002 join the first panel 1900 and the second panel 1902 together to form the series connected assembly 1904. For example, an end vent molding 1906 is positioned to an end bridging aperture 2006 formed within a collector frame 2008 of the first panel 1900 until an inner end surface 1916 of the end vent molding 1906 is in contact with an inner end flange surface 2010 of the end bridging aperture 2006. A fastener 2012 such as a screw or rivet is positioned to each of a plurality of fastener eyelets 1912 of the end vent molding 1906 and engaged with the inner end flange surface 2010 to secure the end vent molding 1906 to the collector frame 2008. In some embodiments, a sealant such as caulking is applied to peripheral interface(s) between the end vent molding 1906 and the collector frame 2008 to further prevent fluid leakage.

The first panel 1900 is then handled such that an exposed portion of the end vent molding 1906, corresponding to approximately half of a width of the end vent molding 1906, is positioned to an end bridging aperture 2016 formed within a collector frame 2008 of the second panel 1902 until an outer end surface 1918 of the end vent molding 1906 is in contact with an inner flange surface 2022 of the end bridging aperture 2016 to mate the first panel 1900 to the second panel 1902. A retention clip 2002 is positioned and secured within a respective fastener recess 2024 defined on a periphery of a front side 2026 of each of the first panel 1900 and the second panel 1902.

In use, solar radiation 2028 strikes a front cover 2030 of each of the first panel 1900 and the second panel 1902 and is transmitted to a collector plate 2032 of each of the first panel 1900 and the second panel 1902 via a respective sealed volume 2034 to heat the respective collector plate 2032. When at least one of the respective collector plates 2032 reach a predetermined temperature, a controller (not shown) coupled to a blower (not shown) actuates the blower to draw inlet air 2036 into a first panel conduit 2038 via a first panel aperture 2040. The first panel conduit 2038 is defined between the collector plate 2032 and a back plate 2042 of the first panel 1900.

The inlet air 2036 is heated in the first panel conduit 2038 and transferred between the first panel 1900 and the second panel 1902 via an end molding vent 1910. The inlet air 2036 is then heated in a second panel conduit 2046 defined between the collector plate 2032 and a back plate 2042 of the second panel 1902 and exhausted via a second panel aperture 2048 as heated outlet air 2050.

Referring now to FIGS. 24-28, a first panel 2400 and a second panel 2402, each configured similar to the panel 118 described above in connection with FIGS. 1-23 are shown arranged in a parallel configuration. When the first panel 2400 and the second panel 2402 are coupled together to form a parallel connected assembly 2404 (i.e., FIG. 27), the parallel connected assembly 2404 may be used for heating the interior volume 106 such as described above with respect to FIGS. 1-4.

Figure 24:
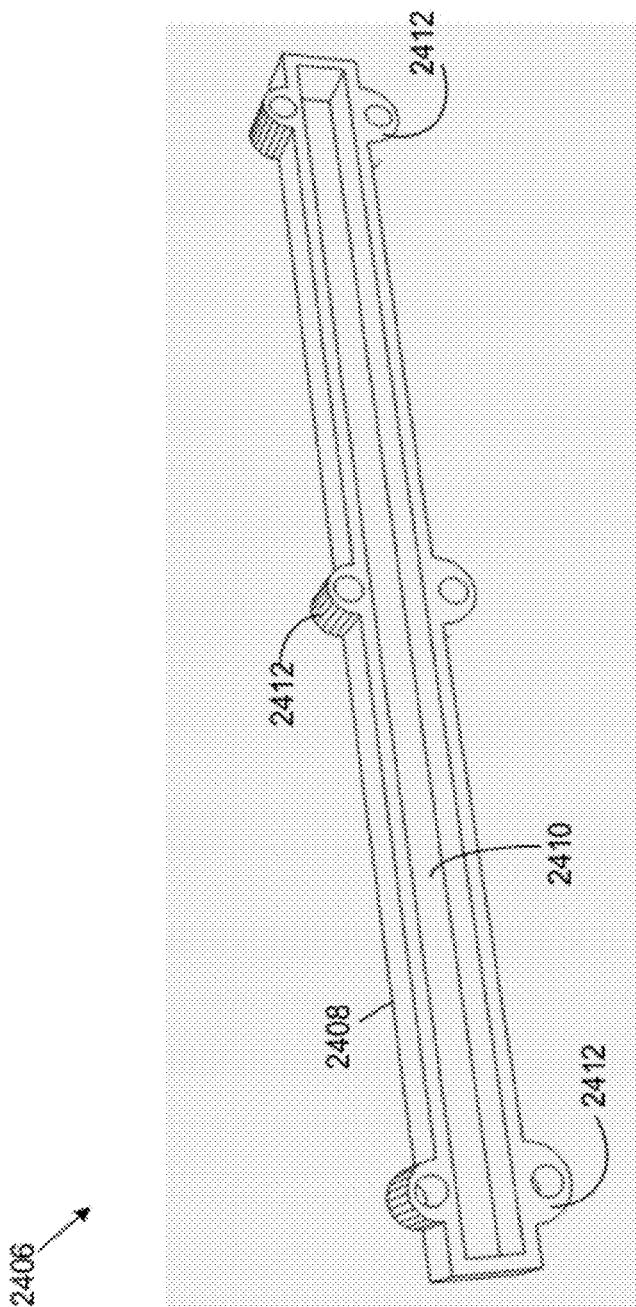
FIG. 24 shows a first view of a side vent molding.
Figure 25:
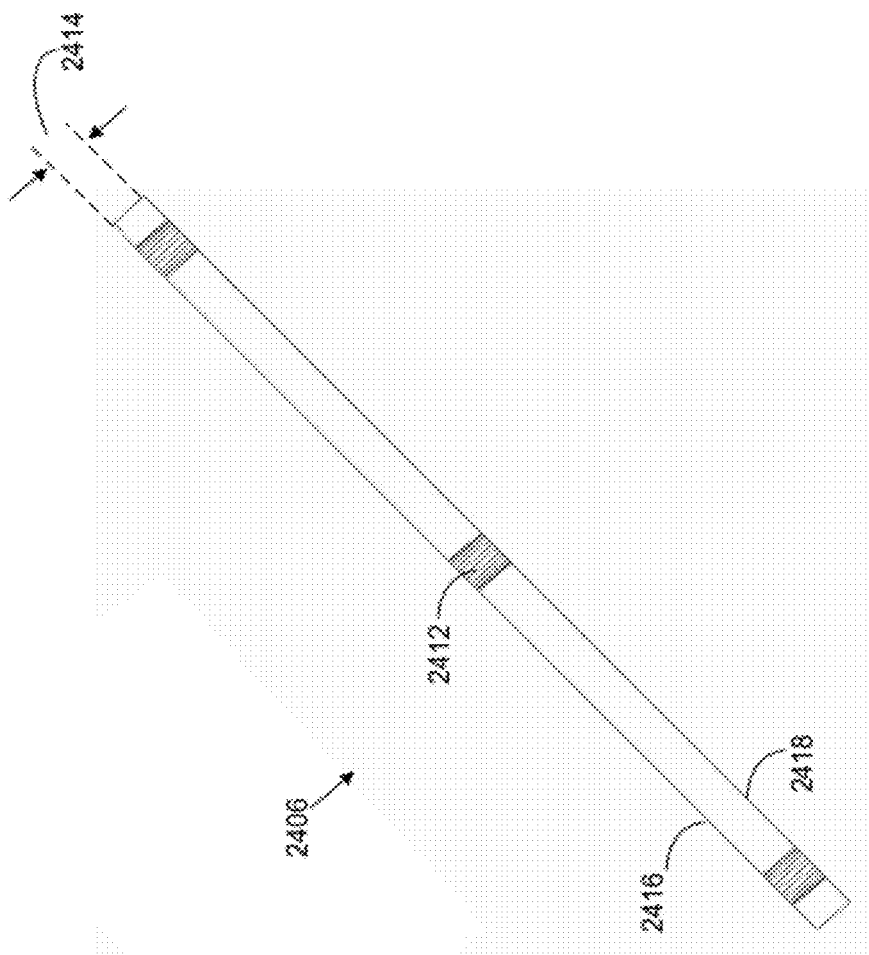
FIG. 25 shows a second view of the side vent molding of FIG. 24.

FIG. 24 shows a side vent molding 2406. FIG. 25 shows a top view of the side vent molding 2406 of FIG. 24. The side vent molding 2406 includes a side molding body 2408 defined by a side molding vent 2410 and a plurality of side molding fastener eyelets 2412. Additionally, the side vent molding 2406 is formed having a fourth width 2414 defined by an inner side surface 2416 and an outer side surface 2418. The fourth width 2414 of the side vent molding 2406 is approximately twice the first width 1118 of the end cap 1110 and the second width 1119 of the side cap 1112 described above, in part, with respect to FIGS. 13-16.

Figure 26:
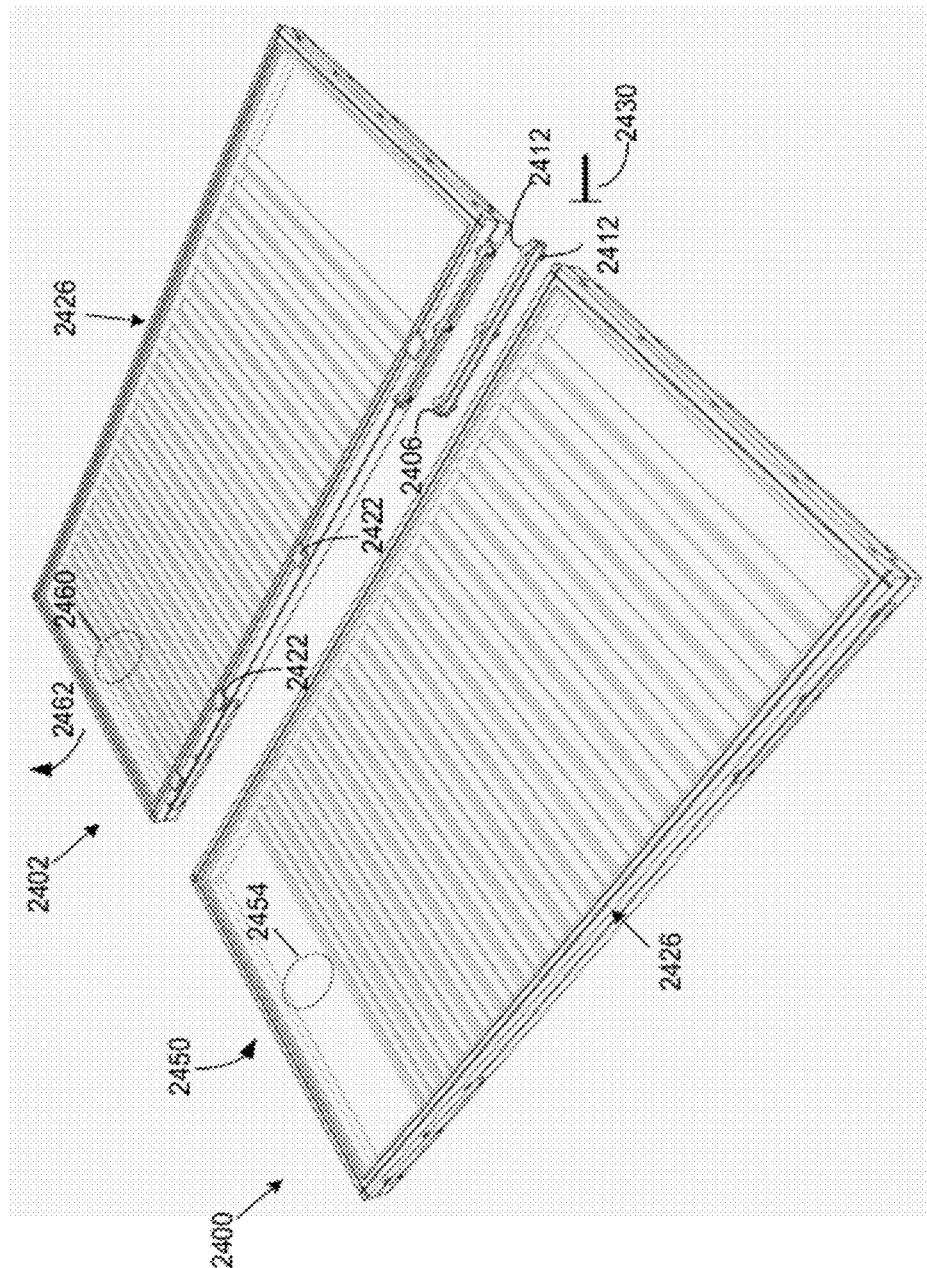
FIG. 26 shows a view of a first and second panel aligned in parallel.
Figure 27:
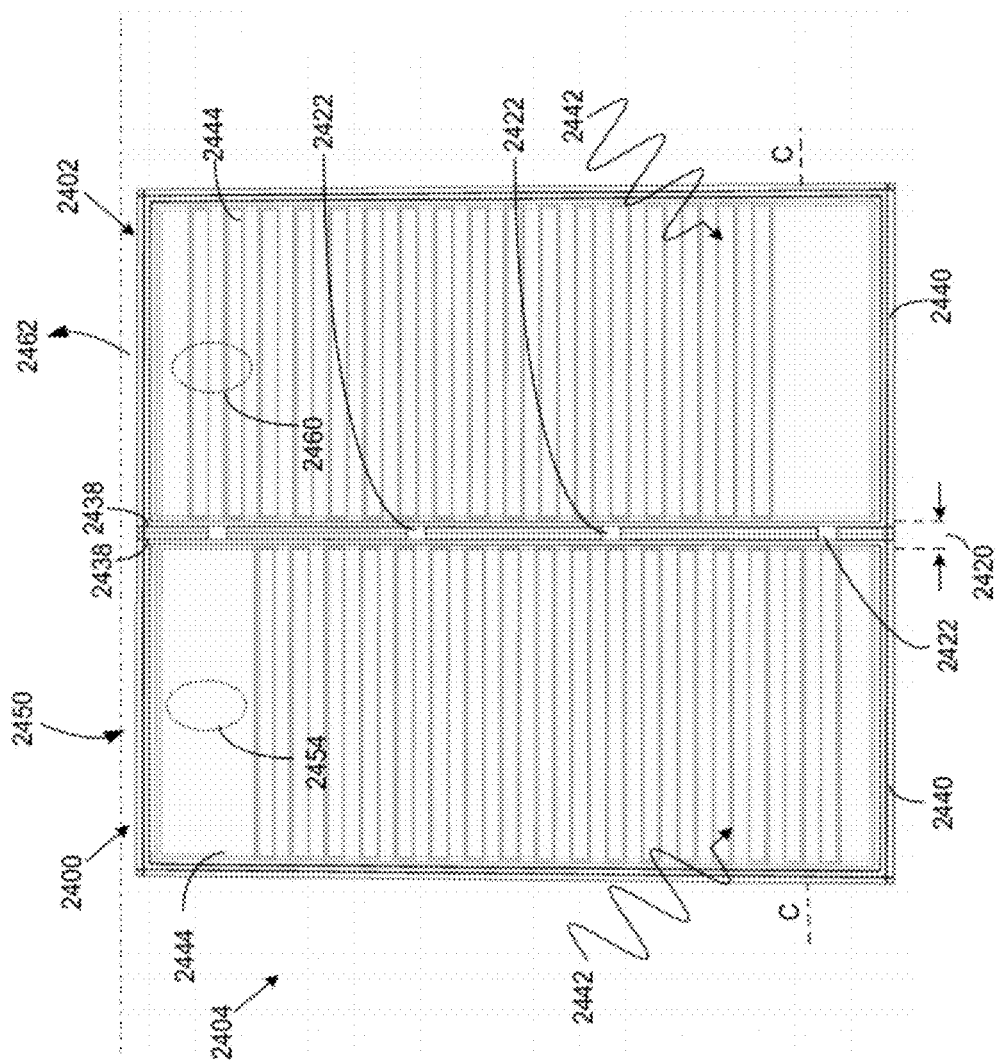
FIG. 27 shows the first and second panel of FIG. 27 coupled in parallel.
Figure 28:
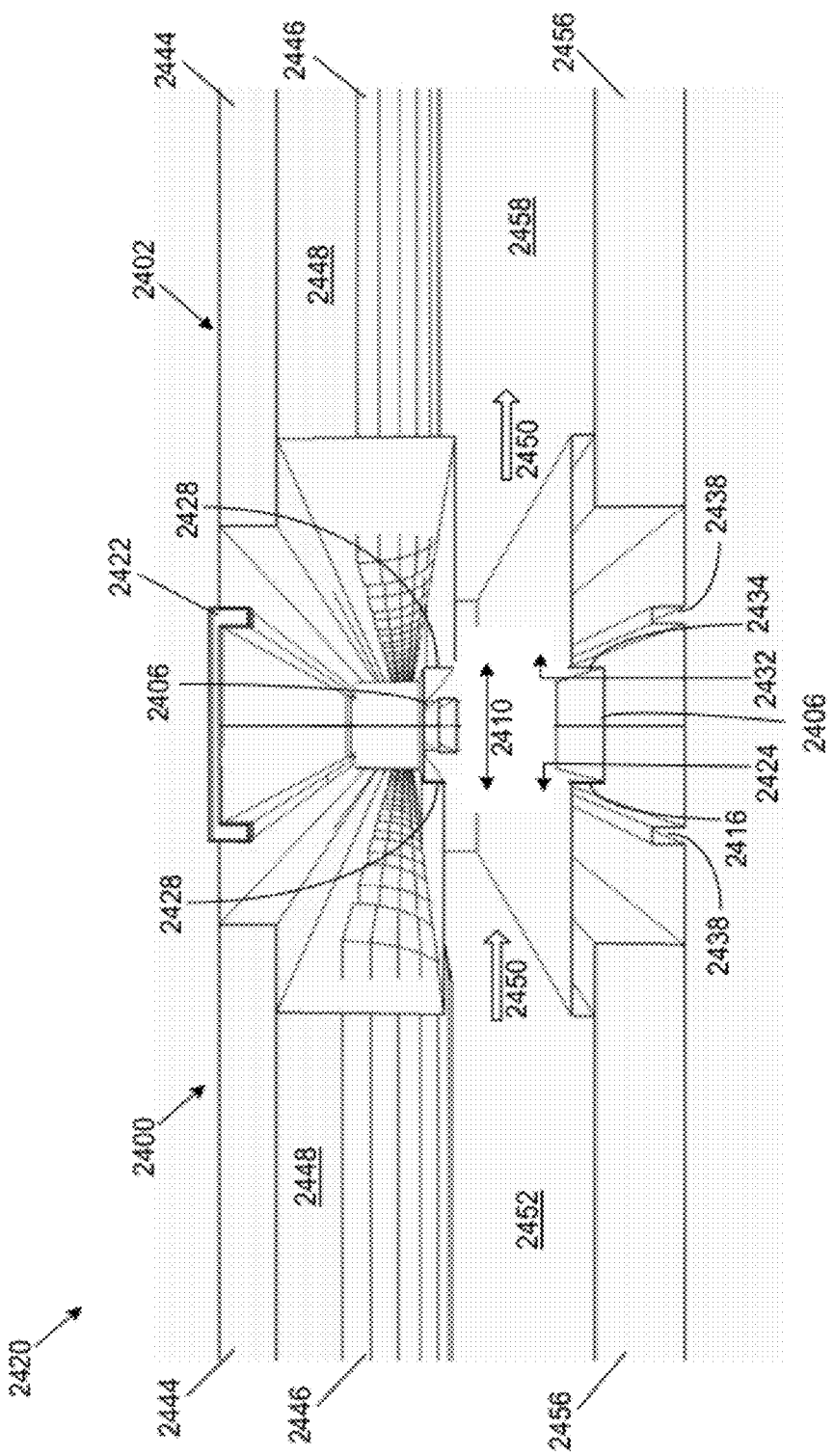
FIG. 28 shows a segmented cross-sectional view of FIG. 27.

FIG. 26 shows the first panel 2400 and the second panel 2402 aligned in a parallel configuration. FIG. 27 shows the first panel 2400 and the second panel 2402 coupled together to form the parallel connected assembly 2404. FIG. 28 shows a segment 2420 of a cross-section C-C of the parallel connected assembly 2404 of FIG. 27.

In general, a side vent molding 2406, as described with respect to FIG. 24, and a plurality of retention clips 2422 join the first panel 2400 and the second panel 2402 together to form the parallel connected assembly 2404. For example, a side vent molding 2406 is positioned to an side bridging aperture 2424 formed within a collector frame 2426 of the first panel 2400 until an inner side surface 2416 of the side vent molding 2406 is in contact with an inner side flange surface 2428 of the side bridging aperture 2424.

A fastener 2430 such as a screw or rivet is positioned to each of a plurality of fastener eyelets 2412 of the side vent molding 2406 and engaged with the inner side flange surface 2428 to secure the side vent molding 2406 to the collector frame 2426. Additionally, in some embodiments, caulking is applied to peripheral interface(s) between the side vent molding 2406 and the collector frame 2426 to prevent fluid leakage.

The first panel 2400 is then handled such that an exposed portion of the side vent molding 2406, corresponding to approximately half of a width of the side vent molding 2406, is positioned to an side bridging aperture 2432 formed within a collector frame 2426 of the second panel 2402 until an outer side surface 2434 of the side vent molding 2406 is in contact with an inner flange surface 2436 of the side bridging aperture 2432 to mate the first panel 2400 to the second panel 2402. A retention clip 2422 is positioned and secured within a respective fastener recess 2438 defined on a periphery of a front side 2440 of each of the first panel 2400 and the second panel 2402.

In use, solar radiation 2442 impinges a front cover 2444 of each of the first panel 2400 and the second panel 2402 an is transmitted via a respective sealed volume 2448 to heat a respective collector plate 2446. When at least one collector plate 2446 reaches a predetermined temperature, a controller (not shown) coupled to a blower (not shown) actuates the blower to draw inlet air 2450 into a first panel conduit 2452 via a first panel aperture 2454. The first panel conduit 2452 defined between the collector plate 2446 and a back plate 2456 of the first panel 2400. The inlet air 2450 is heated in the first panel conduit 2452 and transferred between the first panel 2400 and the second panel 2402 via a side molding vent 2410. The inlet air 2450 is then heated in a second panel conduit 2458 defined between the collector plate 2446 and a back plate 2456 of the second panel 2402 and exhausted via a second panel aperture 2460 as heated outlet air 2462.

Figure 29:
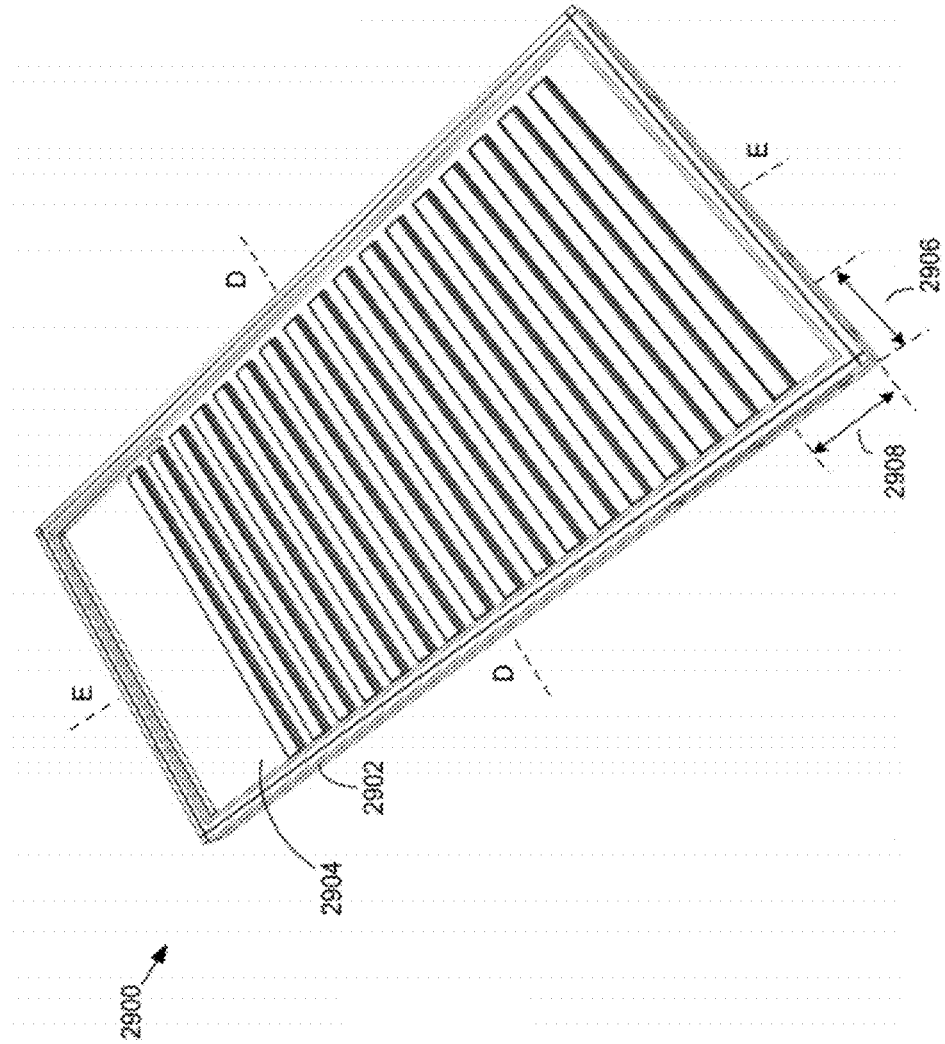
FIG. 29 shows a first view of an example collector.
Figure 30:
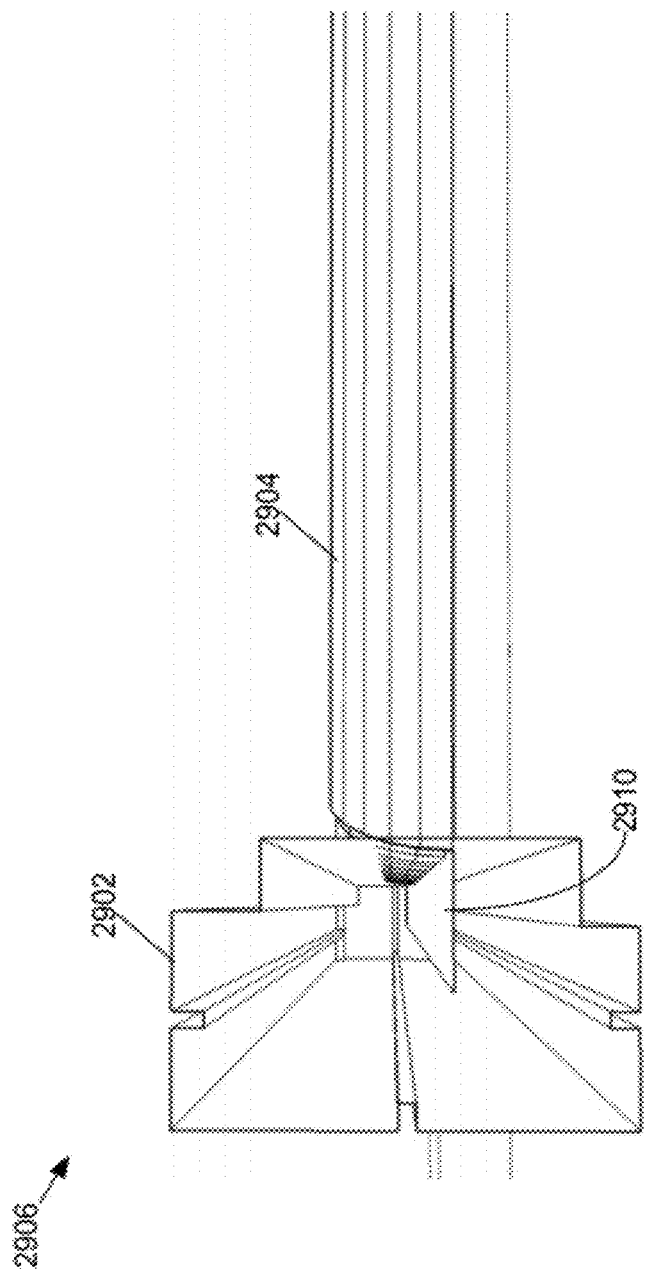
FIG. 30 shows a first segmented cross-sectional view of the collector of FIG. 29.
Figure 31:
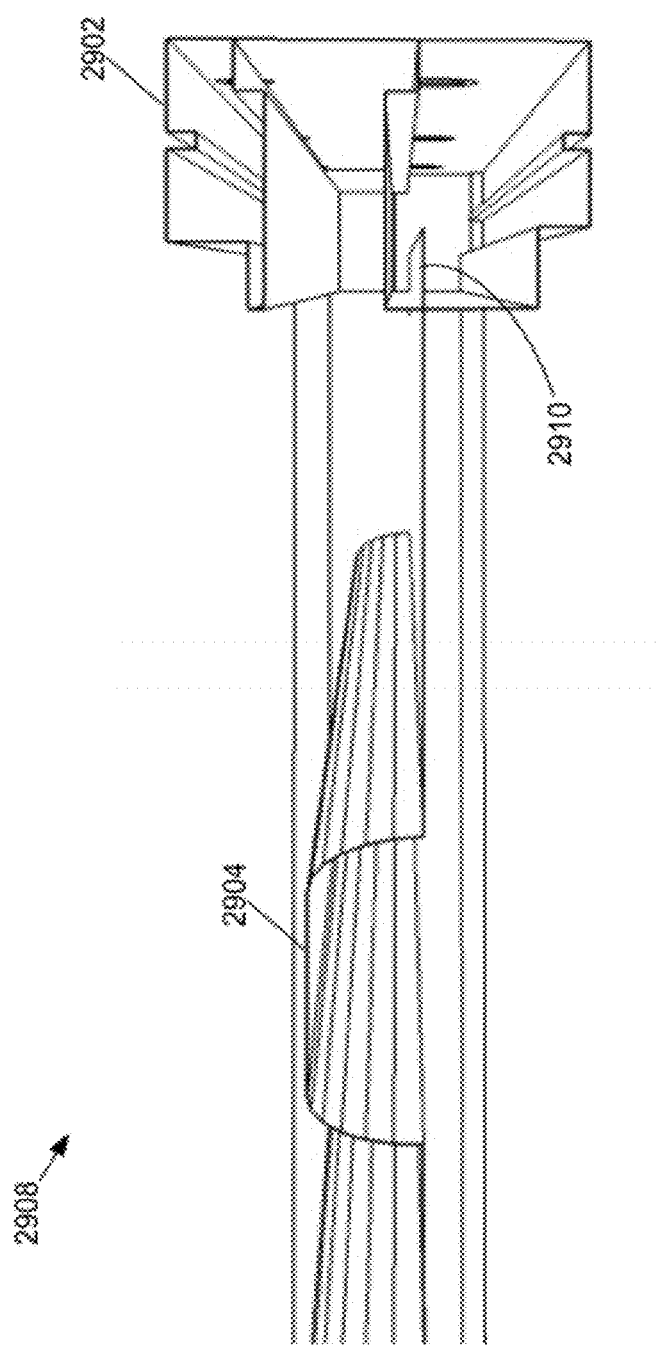
FIG. 31 shows a second segmented cross-sectional view of the collector of FIG. 29.

Referring now to FIGS. 29-31, a collector 2900 is shown including a collector frame 2902 and a collector plate 2904. In general, the collector 2900, collector frame 2902, and collector plate 2904 are configured similar to like elements described above with respect to FIGS. 1-28. In example embodiments, a portion of a perimeter of the collector plate 2904 is molded into the collector frame 2902. In other words, the collector plate 2904 is framed by the collector frame 2902.

FIG. 29 shows the collector 2900 in a first perspective view. FIG. 30 shows a segment 2906 of a cross-section D-D of the collector 2900 of FIG. 29. FIG. 31 shows a segment 2908 of a cross-section E-E of the collector 2900 of FIG. 29. In FIG. 31, a segment 2910 of a perimeter of the collector plate 2904 is shown molded into the collector frame 2902.

In example embodiments, the collector plate 2904 is molded into the collector frame 2902 during an injection molding process. The collector plate 2904 is encapsulated or overmolded into the collector frame 2902 by designing a mold to provide a space to insert the collector plate 2904 into the mold. The mold is then closed, trapping the collector plate 2904 while injected plastic flows around the collector plate 2904 to arrive at an integrally formed unit.

The mold can use tooling or other techniques to hold the collector plate 2904 in correct position so that edges of the collector plate 2904 are positioned correctly for flowing of plastic material around the collector plate 2904 during the molding process. Additionally, a profile, angle, or holes may be introduced into edges of the collector plate 2904 to provide a mechanical bond between injected plastic and the collector plate 2904. Alternately or in conjunction, a chemical treatment that promotes adhesion between the collector plate 2904 and injected plastic may be used prior to the molding process to further integrate the collector plate 2904 into the plastic and to provide better adhesion between the two materials.

FIGS. 32-40 show components of an example second solar heater 3202 according to the principles of the present disclosure. In many aspects, the second solar heater 3202 is similar to the solar heater 102 described above in connection with FIGS. 1-31.

Figure 32:
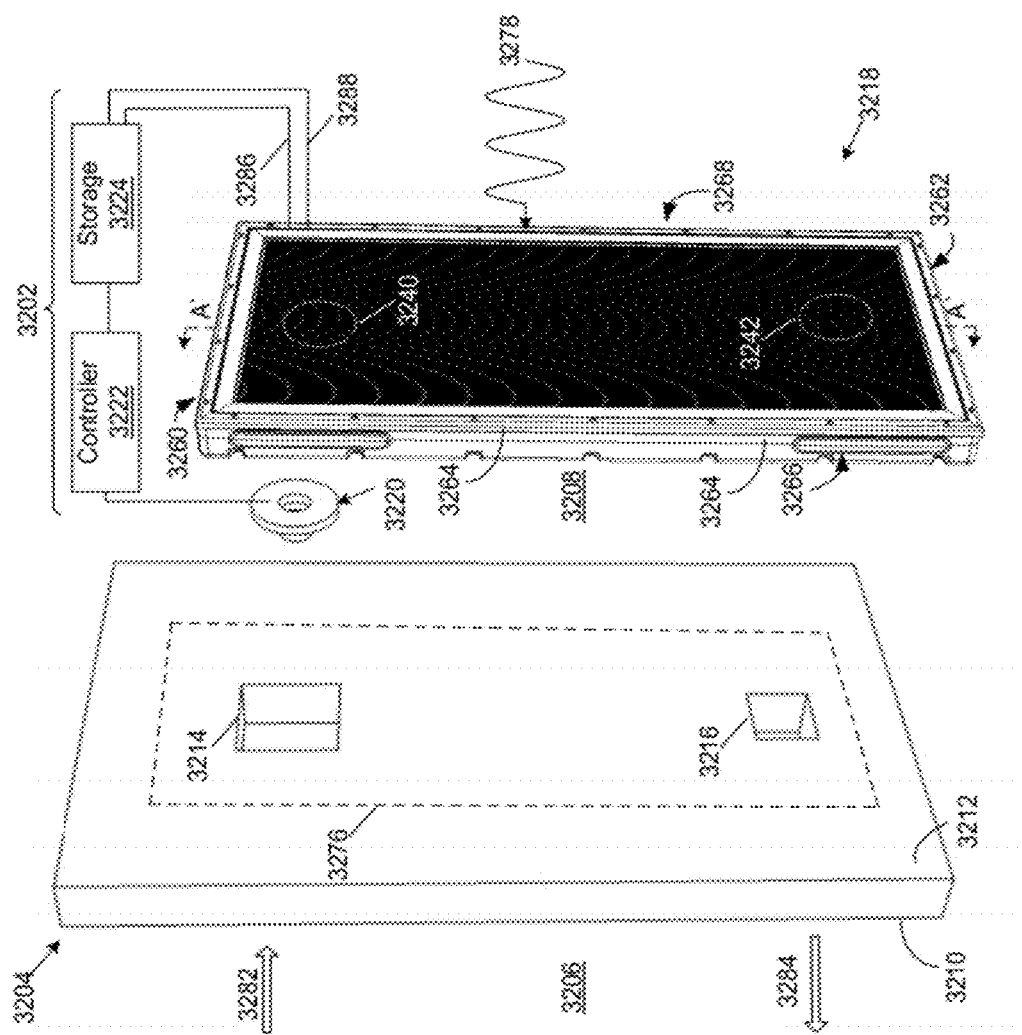
FIG. 32 shows a second example solar heater assembly.

For example, FIG. 32 shows the solar heater 3202 in relation to a portion of a support structure 3204. The support structure 3204 substantially separates an interior volume 3206 from an exterior volume 3208 and includes an interior surface 3210, an exterior surface 3212, a first passage 3214, and a second passage 3216. As discussed in further detail below, the solar heater 3202 includes a panel 3218, a blower 3220, a controller 3222, and a storage unit 3224. Other embodiments are possible. For example, the solar heater 3202 may optionally include a power generator (not shown) similar to the power generator 125 described above.

Figure 33:
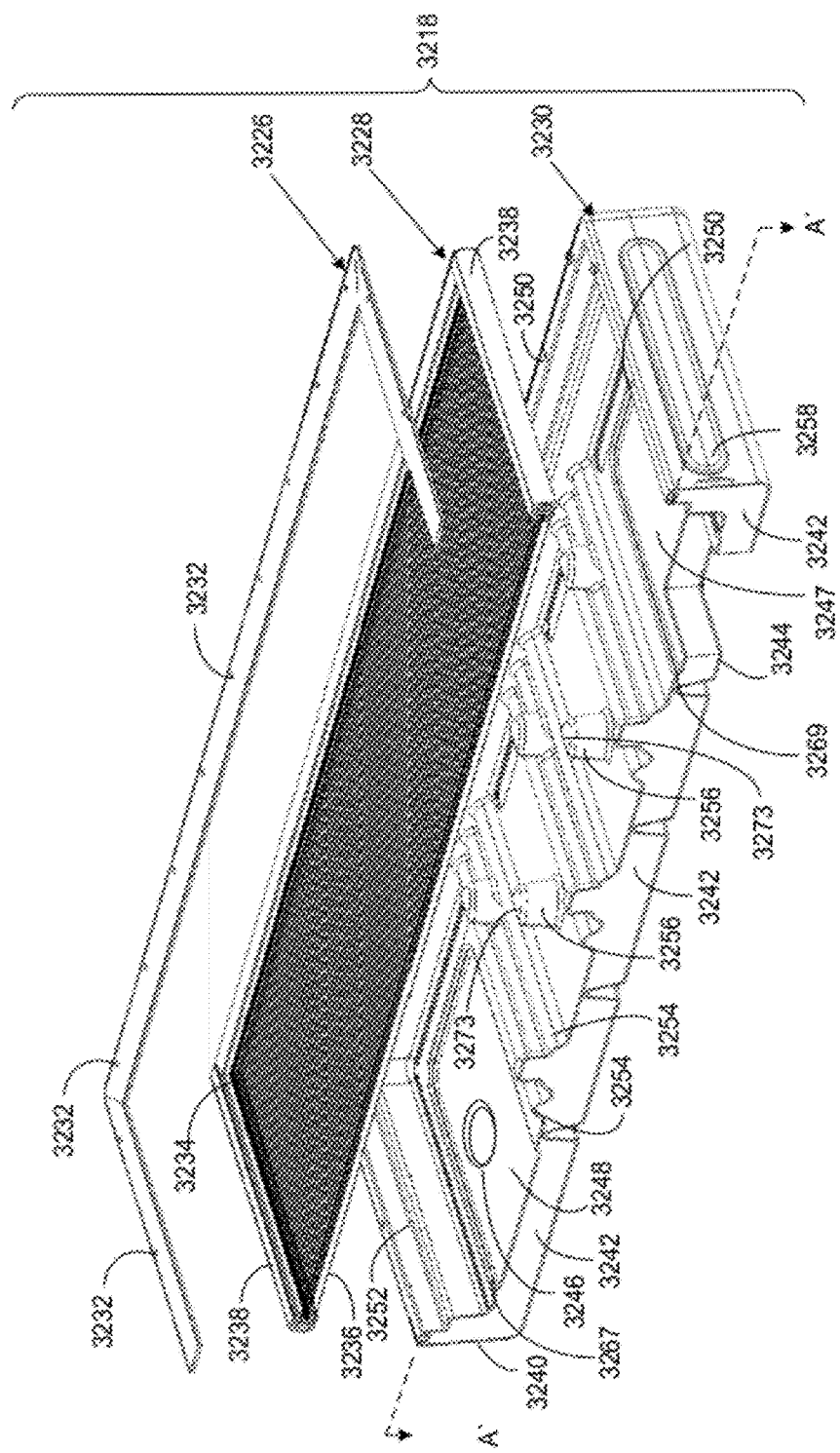
FIG. 33 shows an exploded cross-sectional view of an example panel of the assembly of FIG. 32.

FIG. 33 shows an exploded cross-section A'-A' (i.e., FIG. 32) of the panel 3218. The panel 3218 includes a molding 3226, a collector assembly 3228, and a housing 3230. The molding 3226 is formed of a rigid or a semi-rigid material (e.g., metal, plastic, etc.) and includes a plurality of fastener apertures 3232 formed therein. The collector assembly 3228 includes a panel 3234, a plate 3236, and a sealing assembly 3238. In example embodiments, the panel 3234 is a twin-wall polycarbonate panel and the plate 3236 is a substantially flat metallic plate. Other embodiments are possible. The sealing assembly 3238 is formed of a plurality of components and is coupled to a periphery of both the panel 3234 and the plate 3236, as described in further detail below.

The housing 3230 is formed by a casing 3240 backfilled with an insulative material 3242. In one embodiment, the casing 3240 is a rotationally molded plastic and the insulative material 3242 is a plasticized foam. Other embodiments are possible.

Features defined by the casing 3240 include a first aperture 3244 and a second aperture 3246, the first aperture 3244 and the second aperture 3246 being optionally formed within an inlet area 3247 and an outlet area 3248 respectively during installation of the panel 3218. In general, an installer cuts through and extracts portions of the inlet area 3247 and outlet area 3248 prior to installation of the panel 3218. Geometry and position of the first aperture 3244 and the second aperture 3246 within the inlet area 3247 and outlet area 3248 are left to installer discretion.

Additional features defined by the casing 3240 include a plurality of fastener guides 3250, a flanged surface 3252 extending along an inner periphery of the casing 3240, and turbulence enhancing features including a plurality of corrugations 3254 and a plurality of posts 3256. Further features defined by the casing 3240 include an end vent flange 3258 positioned on both a first end 3260 and a second end 3262 of the casing 3240, a plurality of side vent flanges 3264 (i.e., FIG. 32) positioned on both a first side 3266 and a second side 3268 of the casing 3240, and a first channel 3267 and second channel 3269 (i.e., FIG. 32) positioned along an entire periphery of the inlet area 3247 and outlet area 3248, respectively.

In example embodiments, portions of a respective vent flange 3258, 3264 are extracted for the purpose of coupling similarly configured panels in a series and/or parallel configuration. Additionally, the first channel 3267 and second channel 3269 are configured to provide a dedicated section of the solar heater 3202 for receiving fasteners (not shown) for securing the solar heater 3202 to a support structure (e.g., support structure 3204).

Figure 34:
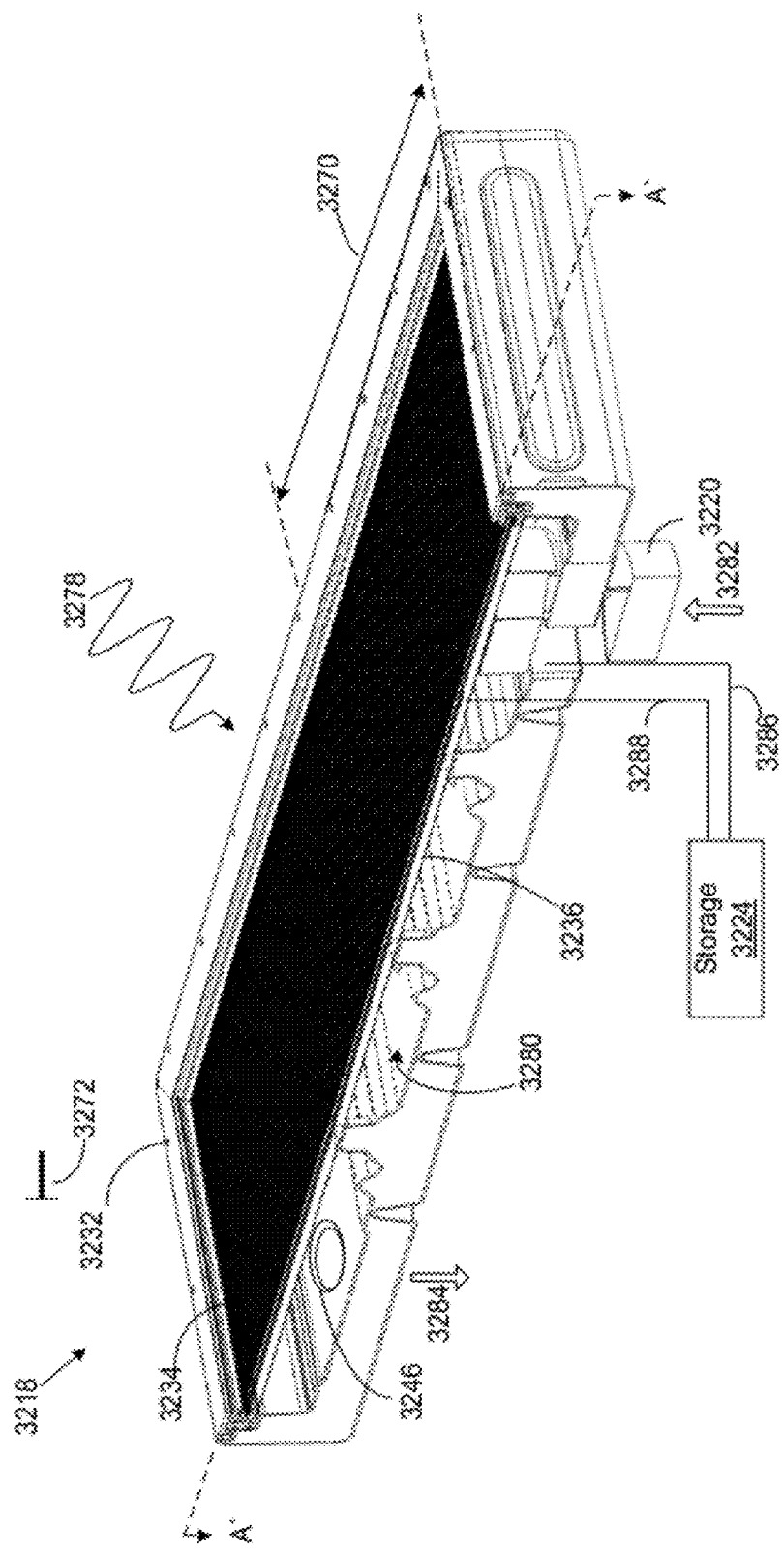
FIG. 34 shows a cross-sectional view of the panel of FIG. 32.
Figure 35:
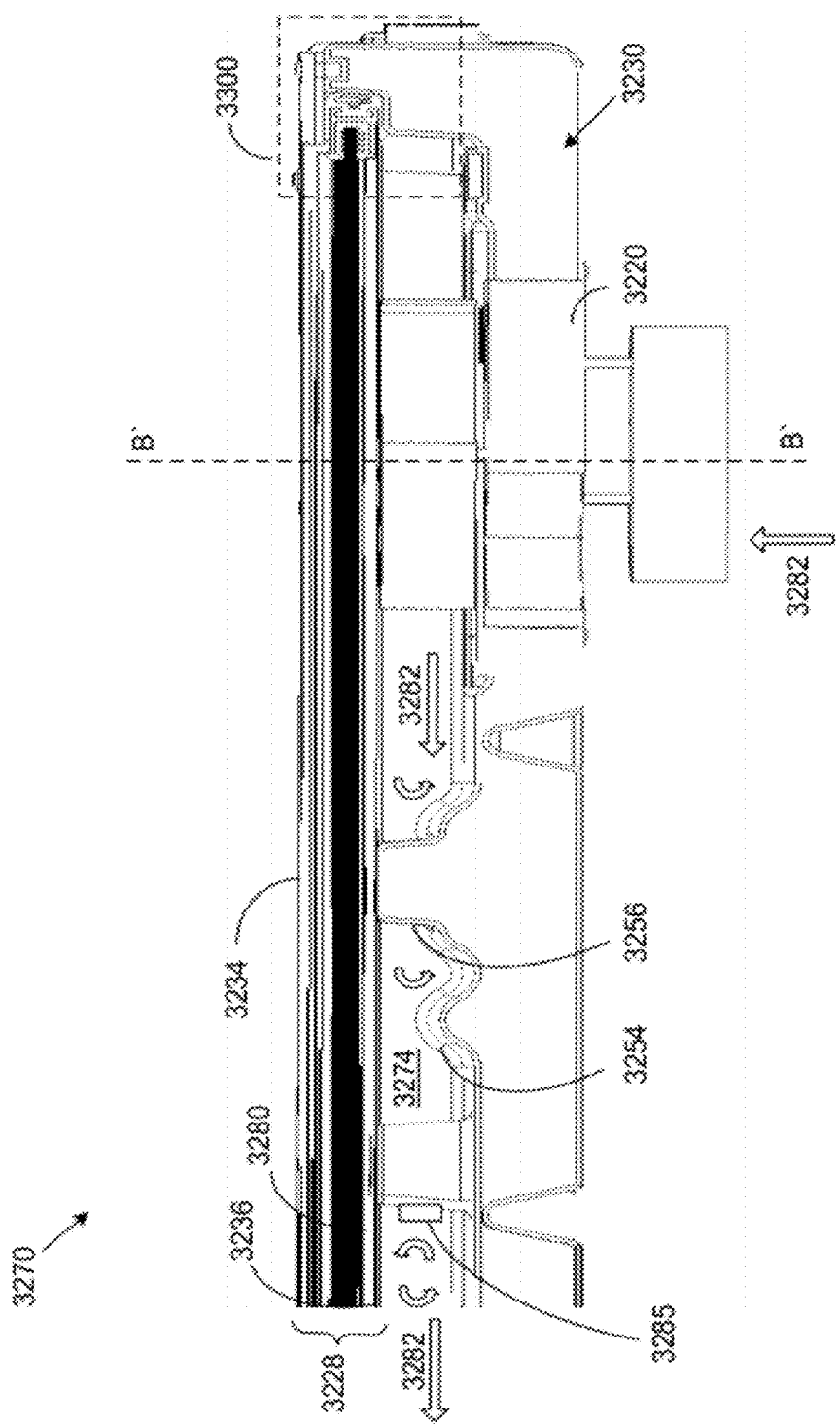
FIG. 35 shows a segmented cross-sectional view of FIG. 34.

FIG. 34 shows the cross-section A'-A' (i.e., FIG. 32) of the panel 3218. FIG. 35 shows a segment 3270 of the panel cross-section of FIG. 34. The collector assembly 3228 is sealed and coupled to the housing 3230 by positioning the sealing assembly 3238 of the collector assembly 3228 to the flanged surface 3252. The molding 3226 is then aligned and positioned to the housing 3230. A fastener 3272 such as a screw, bolt, or rivet is positioned to a respective fastener aperture 3232 and engaged with the housing 3230 via a corresponding fastener guide 3250 to secure the molding 3226 to the housing 3230. In the example embodiment, the plurality of posts 3256 provided support to the collector assembly 3228 by support surfaces 3273 (e.g., FIG. 33) abutting sections of the panel 3234. In this manner, a fluid conduit 3274 is formed between the plate 3236 and the casing 3240, and fluid connection to the conduit 3274 is only established via at least one of the first and second aperture 3244, 3246.

The principle of operation of the second solar heater 3202 is similar to the solar heater 102 described above. For example, the solar heater 3202 is a single pass, flow-behind solar heater configured for heating the interior volume 3206. The blower 3220 is coupled and sealed to the first aperture 3244. The panel 3218 is coupled and sealed to the exterior surface 3212 of the support structure 3204 at a mounting location 3276 (i.e., FIG. 32). The panel 3218 is positioned to the mounting location 3276 such that the first and second passage 3214, 3216 are substantially or approximately aligned with the respective first and second aperture 3244, 3246. In this manner, the conduit 3274 is in fluid connection with the interior volume 3206.

Solar radiation 3278 impinges the panel 3234 and is transmitted to the plate 3236 via a sealed volume 3280 (i.e., FIG. 35) to heat the plate 3236. The sealed volume 3280 is optionally backfilled with pressurized fluid and the plate 3236 is optionally coated to maximize absorptivity and minimize emissivity. Other embodiments are possible.

The controller 3222 is coupled to the blower 3220. When the plate 3236 reaches a predetermined temperature, the controller 3222 actuates the blower 3220 to draw inlet air 3282 from the interior volume 3206 into the conduit 3274. The inlet air 3282 is heated by the plate 3236 in the conduit 3274 via forced convection and is exhausted as heated outlet air 3284 into the interior volume 3206.

In one embodiment, the blower 3220 is configured as a radial fan such that the inlet air 3282 is substantially forced within the conduit 3274 in directions normal to an axis B'-B' (i.e., FIG. 35) aligned along a shaft (not shown) of the blower 3220. Such a configuration further enhances turbulent air flow within the conduit 3274 by forcing an increased volume of per unit time into and over the plurality of corrugations 3254 and the plurality of posts 3256. In some embodiments, a turbulizer 3285 (i.e., FIG. 35) is fitted or coupled to one or more of the plurality of posts 3256 to further enhance turbulent air flow within the conduit 3274. The turbulizer 3285 comprising a flanged element configured at least to direct air flow up and into the plate 3236.

The controller 3222 is configured to adjust speed of the blower 3220 based on temperature of the plate 3236. The controller 3222 is optionally coupled to the storage unit 3224, which in turn is coupled directly or indirectly to the plate 3236 and/or conduit 3274 either through the panel 3218 and/or via the second aperture 3246 (i.e., FIGS. 32 and 34). The storage unit 3224 is configured to draw and store heat via a conduit connection 3286 and/or a collector plate connection 3288 based on an input as provided by the controller 3222.

Figure 36:
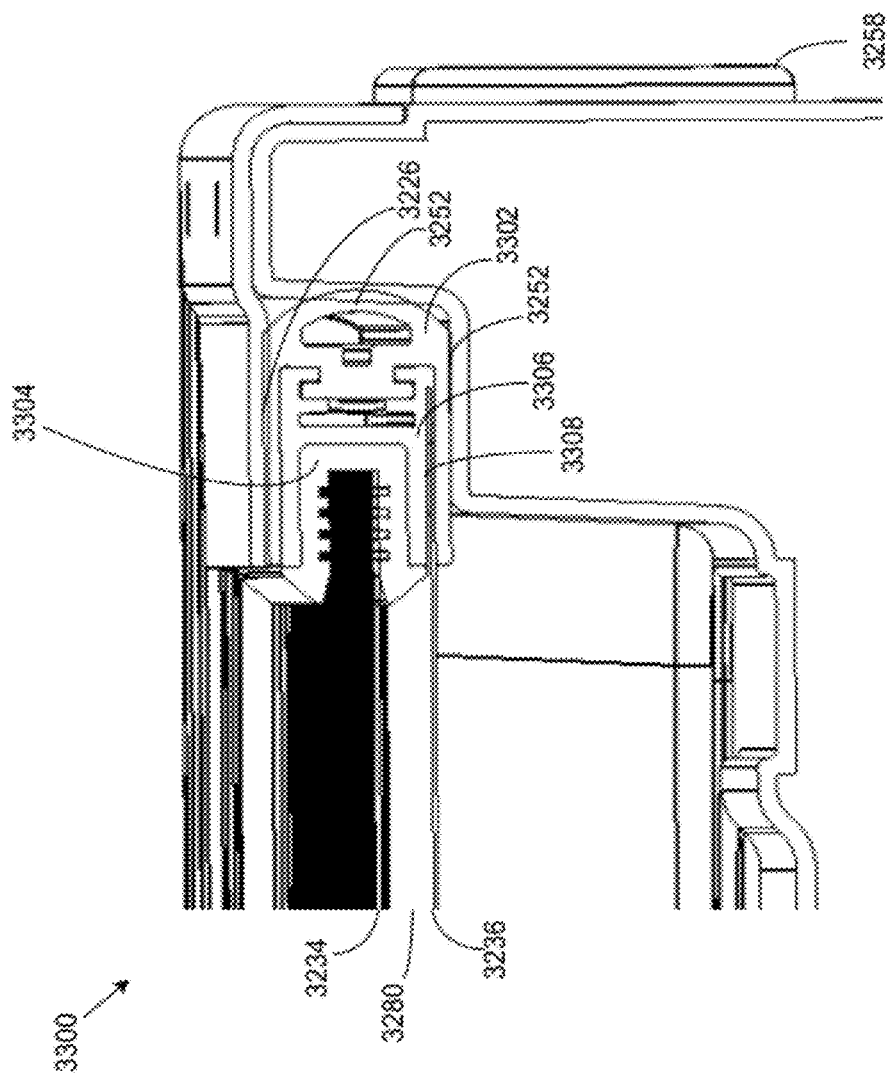
FIG. 36 shows an enlarged view of portions of the view of FIG. 35.

FIG. 36 shows an enlarged view of a section 3300 of the segment 3270 shown in FIG. 35. The section 3300 is used to illustrate components of the example sealing assembly 3238, including a first gasket 3302 and a second gasket 3304 each coupled to a bracket 3306. In example embodiments, the first and second gasket 3302, 3304 are formed of a plastic material such as a polyurethane, and the bracket 3306 is formed of a metal such as aluminum. Other embodiments are possible. For example, in some embodiments, the first gasket 3302 and the second gasket 3304 may be formed as a single integral gasket and co-extruded to the bracket 3306 to form a single component. Still other embodiments are possible.

In the example shown, the first gasket 3302 engages portions of the flanged surface 3252 and portions of the molding 3226 to form a positive compressive seal when the collector assembly 3228 is coupled to the housing 3230 in a manner discussed above. The panel 3234 is positioned to the second gasket 3304 such that the panel 3234 is framed by the sealing assembly 3238. The plate 3236 is positioned between portions of the first gasket 3302 and the bracket 3306 such that the plate 3236 is also framed by the sealing assembly 3238. In this manner, the sealed volume 3280 is formed between the plate 3236 and the panel 3234.

In some embodiments, an adhesive 3308 is positioned between the plate 3236 and the bracket 3306 to mechanically fasten associated portions of the plate to the bracket 3306. An example adhesive includes a high strength bonding tape such 3M® VHB® tape. Other embodiments are possible.

Because of wide temperature variations that may be experienced by the solar heater 3202 in operation, provisions must be made to ensure that an airtight seal is maintained while the unit is in operation. Forces generated by thermal expansion and contraction could cause leakage if the collector assembly 3228 and the housing 3230 were joined with fixed fasteners, ultimately leading to failure of the entire unit or leakage which would result in reduced efficiency. The sealing assembly in 3238 ensures that an air-tight seal is formed between sealing assembly in 3238 and the housing 3230 and that any expansion differences in the structures of the two materials comprising the collector assembly 3228 and the housing 3230 are accounted for in the design without compromising the formed airtight seal.

Figure 37:
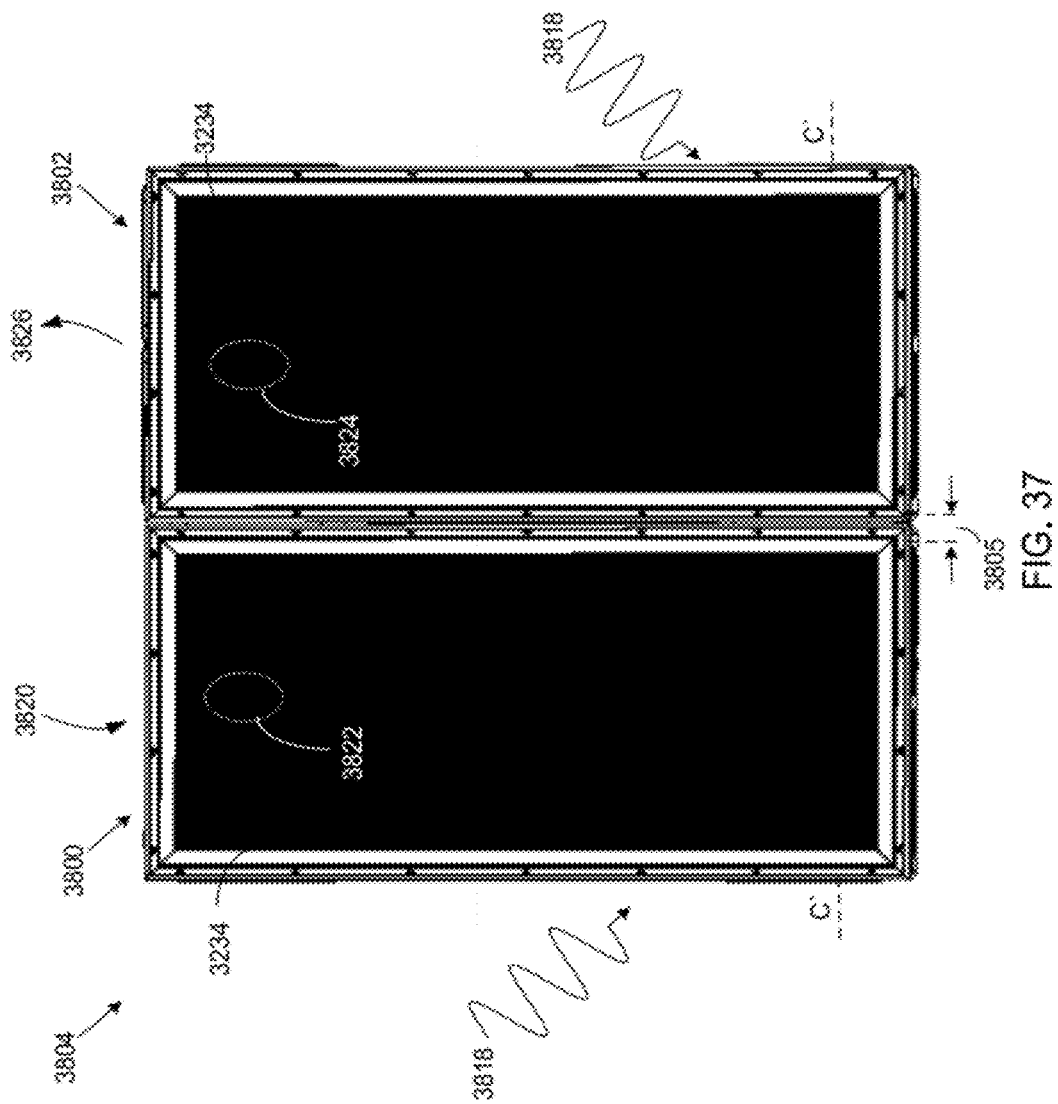
FIG. 37 shows a view of a first and second panel coupled in parallel.
Figure 38:
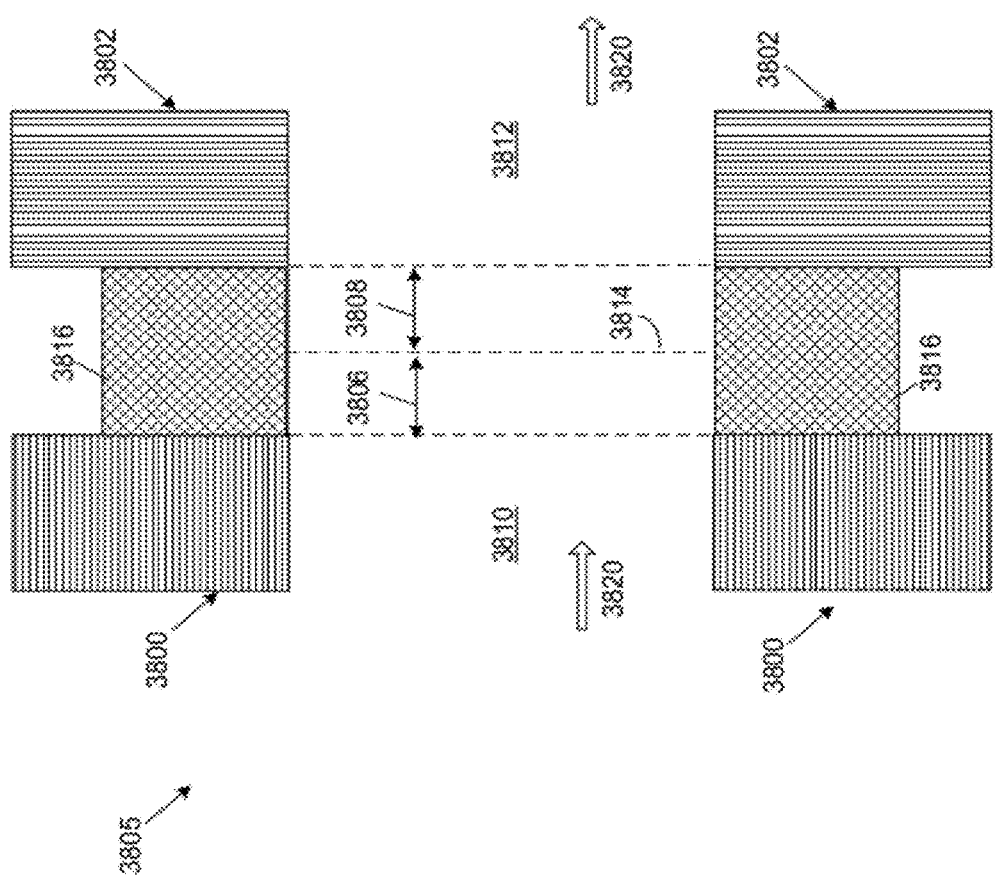
FIG. 38 shows a segmented cross-sectional view of FIG. 37.

Referring now to FIGS. 37 and 38, a first panel 3800 and a second panel 3802, each configured similar to the panel 3218 described above, are shown as a parallel connected assembly 3804. FIG. 37 shows a first view of the parallel connected assembly 3804. FIG. 38 shows a segment 3805 of a cross-section C'-C' of the parallel connected assembly 3804 of FIG. 38. The parallel connected assembly 3804 may be used for heating the interior volume 3206 as described above.

In general, a side vent flange 3806 of the first panel 3800 and a side vent flange 3808 of the second panel 3802 are sealed together to form the parallel connected assembly 3804. In the example embodiment, portions of the side vent flange 3806 are extracted to expose a conduit 3810 of the first panel 3800 as viewed from a position external to the first panel 3800. An instrument such a blade may be used to cut away and into respective portions of the side vent flange 3806. Similarly, portions of the side vent flange 3808 are cut away to expose a conduit 3812 of the second panel 3802. Subsequently, the side vent flange 3806 of the first panel 3800 is aligned and brought into contact with the side vent flange 3808 of the second panel 3802 to form an interface 3814. In this manner, the conduit 3810 of the first panel 3800 is in fluid connection with the conduit 3812 of the second panel 3802.

A molding 3816 such as a gasket or the like is fitted between the first panel 3800 and the second panel 3802 immediately adjacent to an entire periphery of the interface 3814 to seal the side vent flange 3806 to the side vent flange 3808. In some embodiments, a sealant such as caulking is applied to the interface 3814 prior to placement of the molding 3816 and/or applied to the molding 3816 following placement of the molding 3816 to further prevent fluid leakage and/or bolster the seal.

Both of the first panel 3800 and the second panel 3802 include a collector assembly 3228 configured as described above. In use, solar radiation 3818 impinges a panel 3234 of each of the first panel 3800 and the second panel 3802 and is transmitted via a respective sealed volume (e.g., sealed volume 2448) to heat a respective collector plate (e.g., collector plate 2446). When at least one of the collector plates reaches a predetermined temperature, a controller (not shown) coupled to a blower (not shown) actuates the blower to draw inlet air 3820 into the conduit 3810 of the first panel 3800 via a first aperture 3822. The inlet air 3820 is heated in the conduit 3810 and transferred between the first panel 3800 and the second panel 3802 via the sealed passage formed by the side vent flange 3806 of the first panel 3800 and the side vent flange 3808 of the second panel 3802. The inlet air 3820 is then further heated in the conduit 3812 of the second panel 3802 and exhausted via a second aperture 3824 as heated outlet air 3826.

Figure 39:
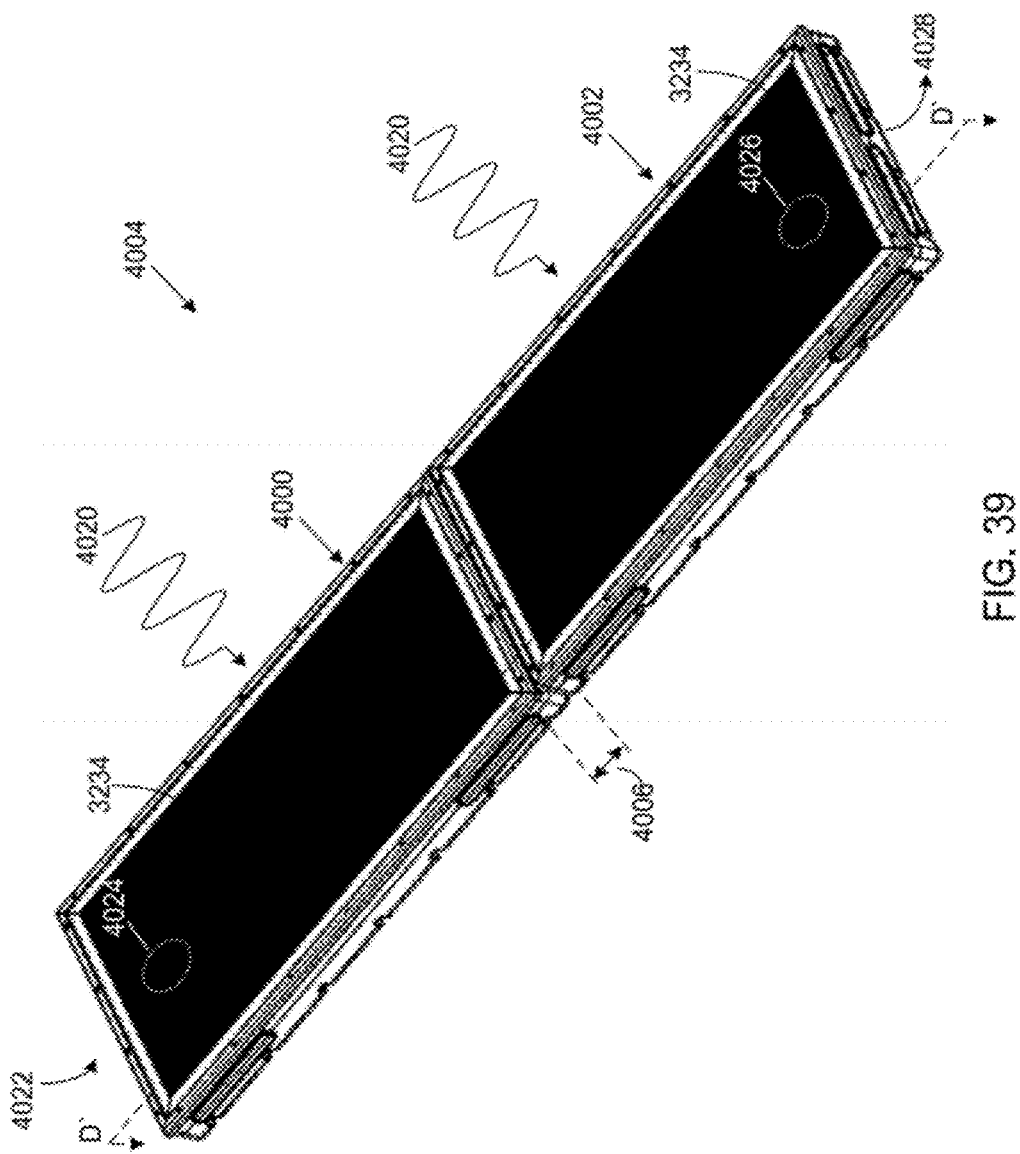
FIG. 39 shows a view of a first and second panel coupled in series.
Figure 40:
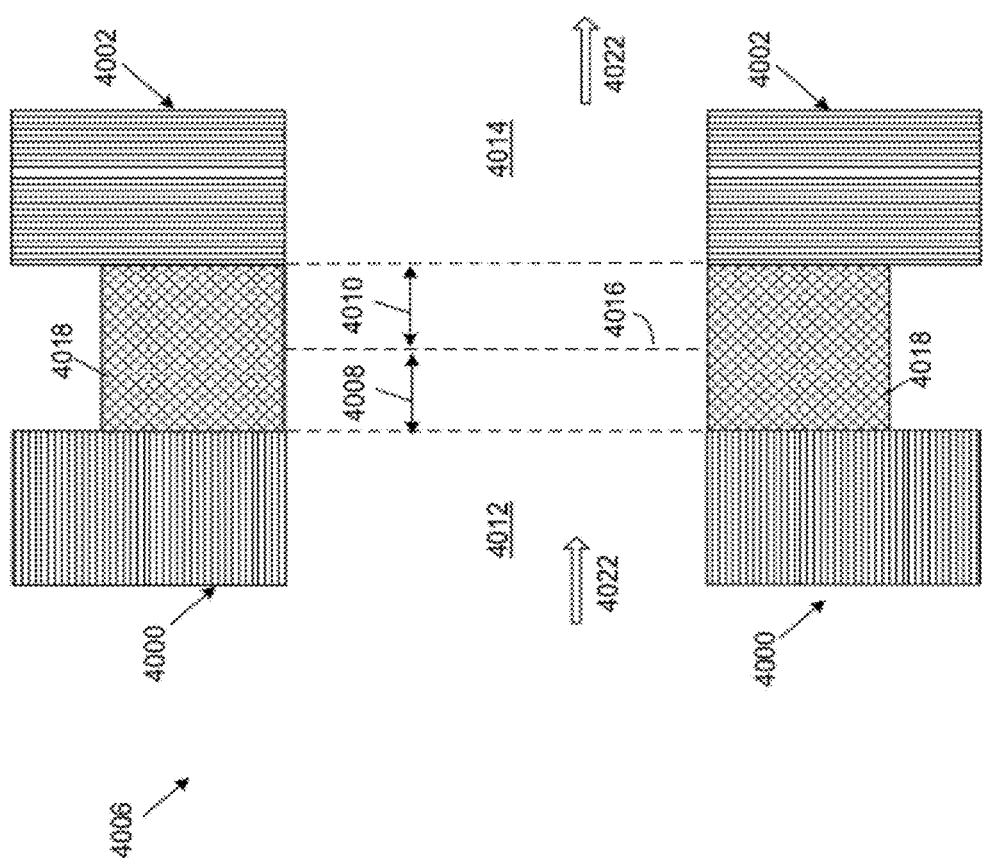
FIG. 40 shows a segmented cross-sectional view of FIG. 39.

Referring now to FIGS. 39 and 40, a first panel 4000 and a second panel 4002, each configured similar to the panel 3218 described above, are shown as a series connected assembly 4004. FIG. 39 shows a first view of the series connected assembly 4004. FIG. 39 shows a segment 4006 of a cross-section D'-D' of the series connected assembly 4004 of FIG. 39. The series connected assembly 4004 may be used for heating the interior volume 3206 as described above.

In general, the series connected assembly 4004 is formed in a substantially equivalent manner to that of the parallel connected assembly 3804 as described above. For example, an end vent flange 4008 of the first panel 4000 and an end vent flange 4010 of the second panel 4002 are sealed together to form the series connected assembly 4004. In the example embodiment, portions of the end vent flange 4008 are extracted to expose a conduit 4012 of the first panel 4000. Similarly, portions of the end vent flange 4010 are cut away to expose a conduit 4014 of the second panel 4002. Subsequently, the end vent flange 4008 of the first panel 4000 is aligned and brought into contact with the end vent flange 4010 of the second panel 4002 to form an interface 4016. In this manner, the conduit 4012 of the first panel 4000 is in fluid connection with the conduit 4014 of the second panel 4002.

A molding 4018 such as a gasket or the like is fitted between the first panel 4000 and the second panel 4002 immediately adjacent to an entire periphery of the interface 416 to seal the end vent flange 4008 to the end vent flange 4010. In some embodiments, a sealant such as caulking is applied to the interface 4016 prior to placement of the molding 4018 and/or applied to the molding 4018 following placement of the molding 4018 to further prevent fluid leakage and/or bolster the seal.

Both of the first panel 4000 and the second panel 4002 include a collector assembly 3228 configured as described above. In practice, solar radiation 4020 impinges a panel 3234 of each of the first panel 4000 and the second panel 4002 and is transmitted via a respective sealed volume (e.g., sealed volume 2448) to heat a respective collector plate (e.g., collector plate 2446). When at least one of the collector plates reaches a predetermined temperature, a controller (not shown) coupled to a blower (not shown) actuates the blower to draw inlet air 4022 into the conduit 4012 of the first panel 4000 via a first aperture 4024. The inlet air 4022 is heated in the conduit 4012 and transferred between the first panel 4000 and the second panel 4002 via the sealed passage formed by the end vent flange 4008 of the first panel 4000 and the end vent flange 4010 of the second panel 4002. The inlet air 4022 is then further heated in the conduit 4014 of the second panel 4002 and exhausted via a second panel aperture 4026 as heated outlet air 4028.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A solar heater for space heating, comprising:
   a collector assembly comprising:
      a metallic plate;
      a cover formed of a material transparent to electromagnetic radiation; and
      a sealing assembly, wherein the plate and the cover are framed by the sealing assembly and a sealed volume is formed between the plate and the cover; and
   a housing coupled to the collector assembly and forming a seal, wherein a conduit is formed between the plate and the housing and is in fluid connection with an external space by at least one aperture formed within the housing, and wherein the housing comprises an exterior section formed of a rigid plastic and an interior section formed of a plasticized insulating foam;
   wherein the solar heater is configured for space heating by transmitting electromagnetic radiation incident on the cover to the plate through the sealed volume, and a working fluid within the conduit is heated by convective heat transfer from the plate and exhausted as a heated outlet fluid through the at least one aperture.

2. The solar heater of claim 1, further comprising a rigid molding coupled to the housing and securing the sealing assembly to the housing.

3. The solar heater of claim 1, wherein the cover comprises a twin wall polycarbonate panel.

4. The solar heater of claim 1, wherein the sealing assembly comprises at least one gasket supported by a rigid bracket.

5. The solar heater of claim 4, wherein portions of a periphery of the metallic plate are positioned between the bracket and the at least one gasket.

6. The solar heater of claim 5, wherein an adhesive is positioned between portions of the metallic plate adjacent to the bracket.

7. The solar heater of claim 6, wherein the adhesive comprises a bonding tape.

8. The solar heater of claim 4, wherein portions of a periphery of the cover are positioned within the at least one gasket.

9. The solar heater of claim 1, wherein portions of the exterior section comprise a plurality of corrugations and a plurality of posts to promote turbulent flow of the working fluid within the conduit.

10. The solar heater of claim 1, wherein the housing comprises a plurality of side flanges each arranged to couple and seal with a side flange of a second housing for sealing the housing to the second housing in a parallel configuration to form a single fluid conduit.

11. The solar heater of claim 1, wherein the housing comprises a plurality of end flanges each arranged to couple with an end flange of a second housing for sealing the housing to the second housing in a series configuration to form a single fluid conduit.

12. A solar heater assembly, comprising:
   a frame comprising: a plate; a polycarbonate panel formed of a material transparent to electromagnetic radiation; and a sealing assembly formed of at least one gasket supported by a rigid bracket, wherein the plate and the panel are framed by the sealing assembly and a sealed volume is formed between the plate and the panel;
   a housing coupled to the frame and forming a seal, wherein a conduit is formed between the plate and the housing and is in fluid connection with a space external the housing by at least one aperture formed within the housing; and a rigid molding coupled to the housing and securing the frame to the housing;

wherein the solar heater assembly is configured for space heating by transmitting electromagnetic radiation incident on the panel to the plate through the sealed volume, and a fluid within the conduit is heated by forced convective heat transfer from the plate and exhausted as a heated fluid into the space external the housing through the at least one aperture.

13. The solar heater assembly of claim 12, wherein portions of a periphery of the plate are positioned between the bracket and the at least one gasket and portions of a periphery of the panel are positioned within the at least one gasket.

14. The solar heater assembly of claim 12, wherein the housing comprises an exterior section formed of a rigid plastic and an interior section formed of an insulating foam.

15. The solar heater assembly of claim 14, wherein portions of the exterior section comprise a plurality of corrugations and a plurality of posts configured to e turbulent fluid flow within the conduit.

16. The solar heater assembly of claim 12, wherein the housing comprises a plurality of side flanges each arranged to couple and seal with a side flange of a second housing for sealing the housing to the second housing in a parallel configuration to form a single fluid conduit.

17. The solar heater assembly of claim 12, wherein the housing comprises a plurality of end flanges each arranged to couple with an end flange of a second housing for sealing the housing to the second housing in a series configuration to form a single fluid conduit.

18. The solar heater assembly of claim 12, further comprising a radial fan coupled to an input aperture formed in the housing.

19. A method for assembling a solar heater configured for space heating, comprising:

forming a collector assembly comprising a metallic plate, a polycarbonate panel, and a sealing assembly, wherein the plate and the panel are framed by the sealing assembly and a sealed volume is formed between the plate and the panel;

forming a housing comprising forming an exterior section of the housing by rotational molding and injecting an insulating foam into an interior section of the housing, wherein a plurality of corrugations and a plurality of posts are formed on the exterior section of the housing;

coupling the collector assembly to the housing forming a seal, wherein a conduit is formed between the plate and the housing and is in fluid connection with a space external the housing by at least one aperture formed within the housing, and wherein the plurality of corrugations and plurality of posts formed on the exterior casing of the housing promote turbulent fluid flow within the conduit; and coupling a rigid molding to the housing securing the sealing assembly to the housing;

wherein the solar heater is configured for space heating by transmitting electromagnetic radiation incident on the panel to the plate through the sealed volume, and a working fluid within the conduit is heated by convective heat transfer from the plate and exhausted as a heated outlet fluid through the at least one aperture.

* * * * *